United States Patent
Durkot et al.

(10) Patent No.: US 7,435,395 B2
(45) Date of Patent: Oct. 14, 2008

(54) ALKALINE CELL WITH FLAT HOUSING AND NICKEL OXYHYDROXIDE CATHODE

(75) Inventors: Richard E. Durkot, East Walpole, MA (US); Paul A. Christian, Norton, MA (US); Dean MacNeil, Cambridge, MA (US); James R. Costanzo, Danbury, CT (US); David Anglin, Brookfield, CT (US); Mark Ashbolt, Newtown, CT (US); Derek Bobowick, Sandy Hook, CT (US); Robert S. Ferrin, Bethel, CT (US); Anthony Malgioglio, Stamford, CT (US); Brien Merrill, New Fairfield, CT (US); Alexander Shelekhin, Ridgefield, CT (US); Steven J. Specht, Brookfield, CT (US); Matthew Sylvestre, Woodbury, CT (US); Philip Trainer, Sandy Hook, CT (US); Robert A. Yoppolo, New Milford, CT (US)

(73) Assignee: The Gillette Company, Boston, MA (US)

(*) Notice: Subject to any disclaimer, the term of this patent is extended or adjusted under 35 U.S.C. 154(b) by 915 days.

(21) Appl. No.: 10/863,882

(22) Filed: Jun. 9, 2004

(65) Prior Publication Data

US 2004/0237293 A1 Dec. 2, 2004

Related U.S. Application Data

(63) Continuation-in-part of application No. 10/722,879, filed on Nov. 26, 2003, now Pat. No. 7,294,429, which is a continuation-in-part of application No. 10/414,750, filed on Apr. 16, 2003, now Pat. No. 7,094,494, which is a continuation-in-part of application No. 10/336,261, filed on Jan. 3, 2003, now Pat. No. 6,833,215.

(51) Int. Cl.
- H01M 6/04 (2006.01)
- H01M 2/00 (2006.01)
- H01M 2/02 (2006.01)
- H01M 4/58 (2006.01)
- H01M 4/00 (2006.01)

(52) U.S. Cl. .......... 422/206; 429/163; 429/179; 429/229; 429/223; 429/122

(58) Field of Classification Search .......... 429/223, 429/229, 163
See application file for complete search history.

(56) References Cited

U.S. PATENT DOCUMENTS 985,634 A 2/1911 Rodgers
(Continued)

FOREIGN PATENT DOCUMENTS

CA 2165152 6/1997
(Continued)

Primary Examiner—Patrick Ryan
Assistant Examiner—Helen Chu
(74) Attorney, Agent, or Firm—Barry D. Josephs; Kevin C. Johnson; Leo J. White

(57) ABSTRACT

An alkaline cell having a flat casing, preferably of cuboid shape. The cell can have an anode comprising zinc and a cathode comprising nickel oxyhydroxide. The casing can have a relatively small overall thickness, typically between about 5 and 10 mm, but may be larger. Cell contents can be supplied through an open end in the casing and an end cap assembly inserted therein to seal the cell. The end cap assembly includes a vent mechanism, preferably a grooved vent, which can activate, when gas pressure within the cell reaches a threshold level typically between about 250 and 800 psig ($1724 \times 10^3$ and $5515 \times 10^3$ pascal gage). The cell can have a supplemental vent mechanism such as a laser welded region on the surface of the casing which may activate at higher pressure levels.

22 Claims, 18 Drawing Sheets

U.S. PATENT DOCUMENTS

| | | | |
|---|---|---|---|
| 2,478,798 A | 8/1949 | Williams | |
| 2,525,436 A | 10/1950 | Williams | |
| 4,154,906 A * | 5/1979 | Bubnick et al. | 429/94 |
| 4,175,166 A | 11/1979 | Rosansky | |
| 4,245,010 A | 1/1981 | Golz | |
| 4,250,232 A | 2/1981 | Davidson | |
| 4,256,812 A | 3/1981 | Tamura | |
| 4,484,691 A | 11/1984 | Lees | |
| 4,576,303 A | 3/1986 | Mundt | |
| 4,722,874 A | 2/1988 | Marchak | |
| 4,789,608 A | 12/1988 | Oswald | |
| 4,803,136 A | 2/1989 | Bowsky | |
| 5,451,475 A | 9/1995 | Ohta | |
| 5,500,309 A | 3/1996 | Lichtenberg | |
| 5,626,988 A * | 5/1997 | Daniel-Ivad et al. | 429/229 |
| 6,081,992 A * | 7/2000 | Kelemen et al. | 29/623.1 |
| 6,143,442 A | 11/2000 | Takahashi | |
| 6,159,631 A | 12/2000 | Thompson | |
| 6,168,883 B1 | 1/2001 | Urry | |
| 6,183,903 B1 | 2/2001 | Campbell et al. | |
| 6,210,833 B1 | 4/2001 | Bernard | |
| 6,248,472 B1 | 6/2001 | Kelemen | |
| 6,284,410 B1 | 9/2001 | Durkot | |
| 6,472,103 B1 | 10/2002 | Durkot | |
| 6,492,062 B1 | 12/2002 | Wang | |
| 6,521,372 B2 | 2/2003 | Urry | |
| 6,521,378 B2 | 2/2003 | Durkot | |
| 6,558,842 B2 | 5/2003 | Seyama | |
| 6,576,368 B1 | 6/2003 | Ogasawara | |
| 6,579,640 B1 | 6/2003 | Nagase et al. | |
| 6,617,072 B2 | 9/2003 | Venkatesan | |
| 6,686,091 B2 | 2/2004 | Yamamoto et al. | |
| 2003/0186125 A1 | 10/2003 | Shimakawa | |
| 2003/0232247 A1 | 12/2003 | Loffler | |
| 2004/0009394 A1 | 1/2004 | Ito | |

FOREIGN PATENT DOCUMENTS

| | | |
|---|---|---|
| EP | 1341248 A1 | 9/2003 |
| EP | 1372201 A1 | 12/2003 |
| JP | 57(1982)-182972 | 11/1982 |
| JP | 1993-90809 | 12/1993 |
| JP | 1995-211300 | 8/1995 |
| JP | 09259842 A | 10/1997 |
| JP | 1998-92397 | 4/1998 |
| JP | 1998-269997 | 10/1998 |
| JP | 1999-185714 | 7/1999 |
| JP | 1999-213978 | 8/1999 |
| JP | 2000-223102 | 8/2000 |
| JP | 2001-35467 | 2/2001 |
| JP | 2001-143664 | 5/2001 |
| JP | 2003-017077 | 1/2003 |
| JP | 2003-086163 | 3/2003 |
| JP | 2003-257423 A2 | 9/2003 |
| WO | WO 00/02278 | 1/2000 |
| WO | WO 01/61770 A1 | 8/2001 |
| WO | WO 01/86740 A2 | 11/2001 |
| WO | WO 03034520 A1 | 4/2003 |
| WO | WO 03067689 A1 | 8/2003 |
| WO | WO 03/090956 A1 | 11/2003 |
| WO | WO 2004/010513 A2 | 1/2004 |
| WO | WO 2004025759 A2 | 3/2004 |

* cited by examiner

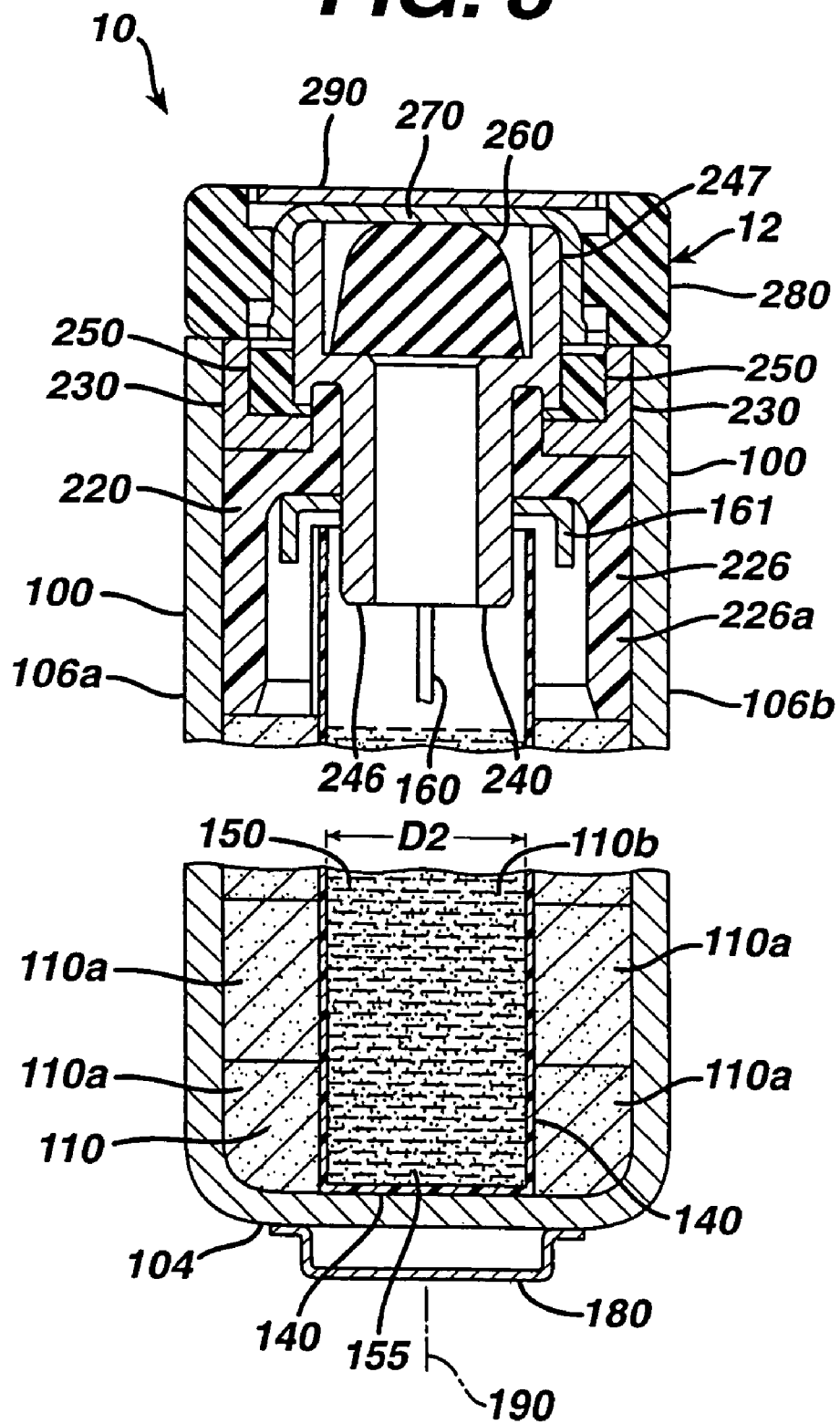

FIG. 10
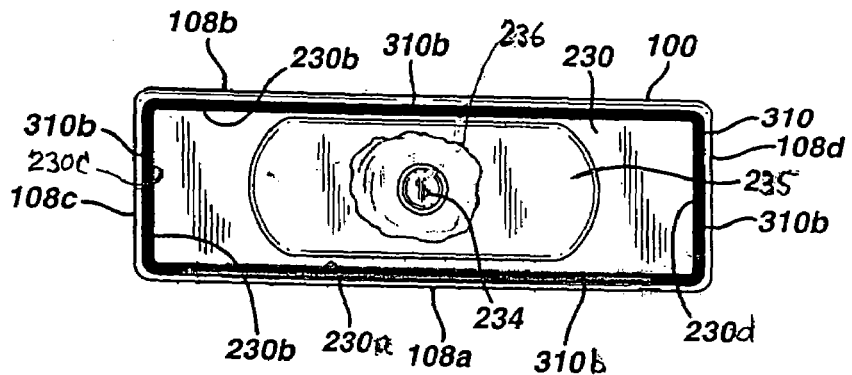
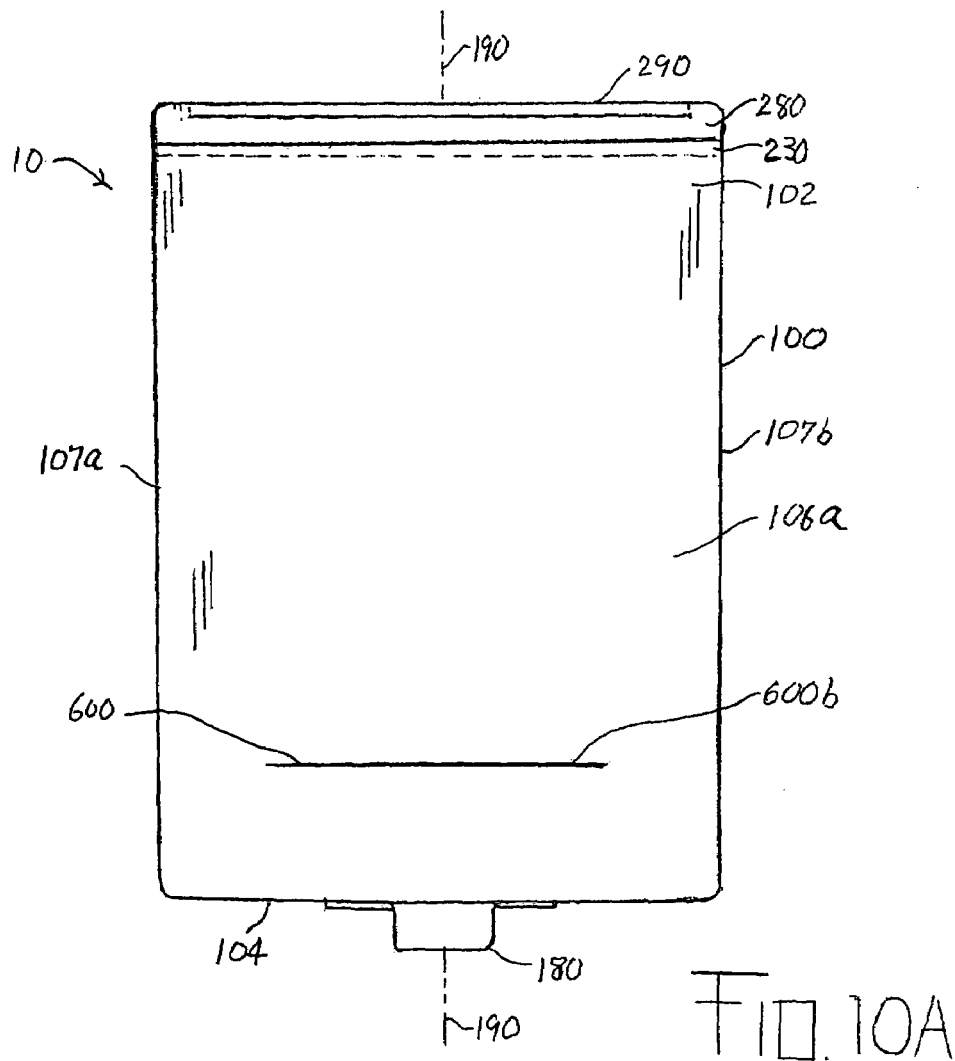
FIG. 10A

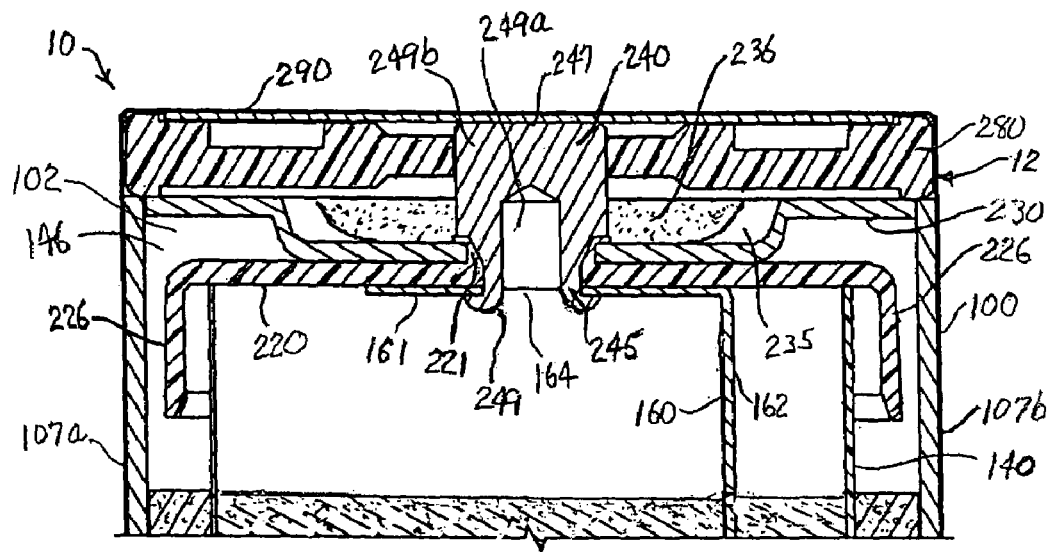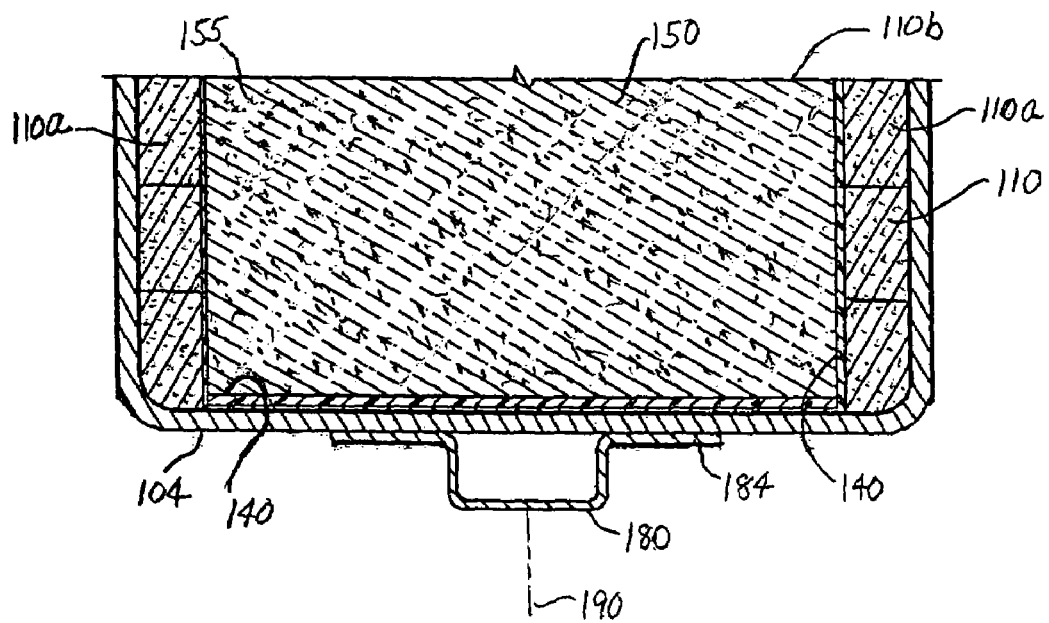
Fig. 11

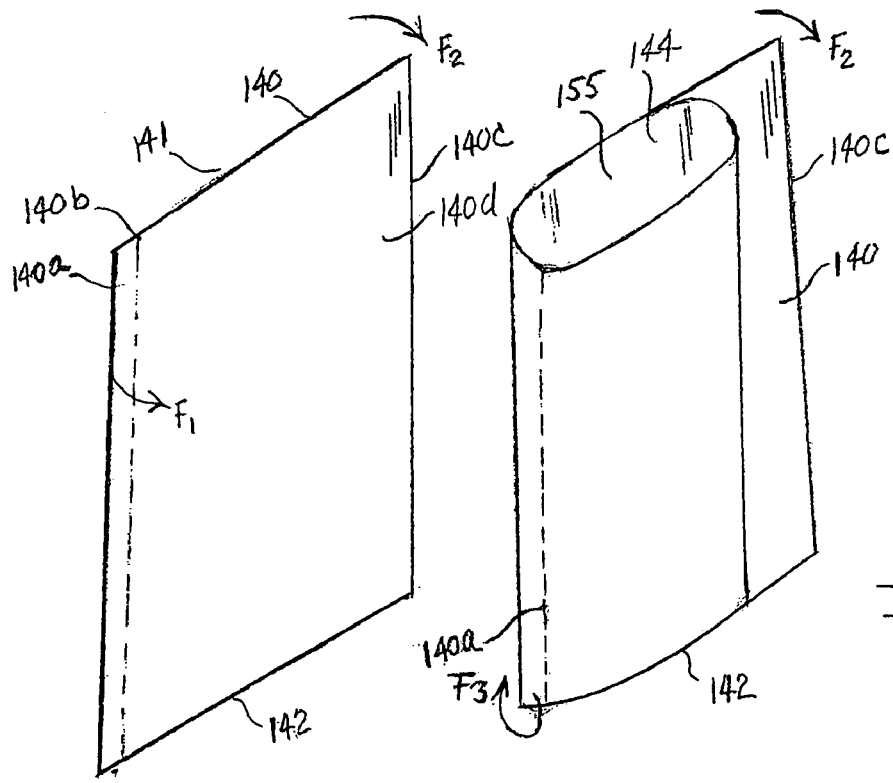
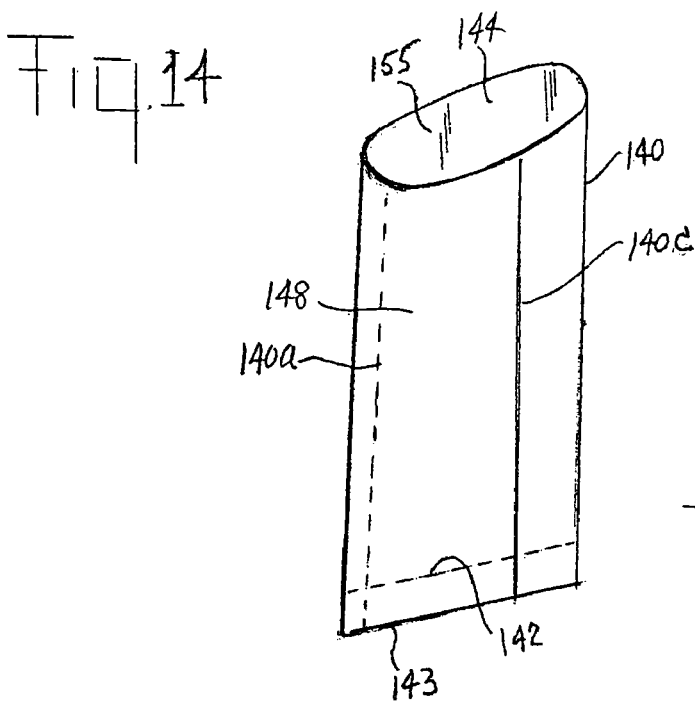

ALKALINE CELL WITH FLAT HOUSING AND NICKEL OXYHYDROXIDE CATHODE

CROSS REFERENCE TO RELATED APPLICATIONS

This application is a continuation in part of application Ser. No. 10/722,879 filed Nov. 26, 2003, now U.S. Pat. No. 7,294,429, which is continuation in part of Ser. No. 10/414,750 filed Apr. 16, 2003, now U.S. Pat. No. 7,094,494, which is a continuation in part of application Ser. No. 10/336,261 filed Jan. 3, 2003, now U.S. Pat. No. 6,833,215.

FIELD OF THE INVENTION

The invention relates to an alkaline battery having a substantially flat outer housing. The invention relates to alkaline battery having an anode comprising zinc, a cathode comprising nickel oxyhydroxide, and an electrolyte comprising aqueous potassium hydroxide.

BACKGROUND

Conventional alkaline electrochemical cells have an anode comprising zinc and a cathode comprising manganese dioxide. The cell is typically formed of a cylindrical outer housing. The fresh cell has an open circuit voltage (EMF) of about 1.5 volt and typical average running voltage of between about 1.0 to 1.2 Volt in medium drain service (100 to 300 milliamp). The cylindrical housing is initially formed with an enlarged open end and opposing closed end. After the cell contents are supplied, an end cap assembly with insulating grommet and negative terminal end cap is inserted into the housing open end. The open end is closed by crimping the housing edge over an edge of the insulating plug and radially compressing the housing around the insulating plug to provide a tight seal. The insulating grommet electrically insulates the negative end cap from the cell housing. A portion of the cell housing at the opposing closed end forms the positive terminal.

A problem associated with design of various electrochemical cells, particularly alkaline cells, is the tendency of the cell to produce gases as it continues to discharge beyond a certain point, normally near the point of complete exhaustion of the cell's useful capacity. Electrochemical cells, particularly alkaline cells, are conventionally provided with rupturable diaphragms or rupturable membranes within the end cap assembly. The rupturable diaphragm or membrane may be formed within a plastic insulating member as described, for example, in U.S. Pat. No. 3,617,386.

A cylindrical alkaline cell comprising a zinc anode and nickel oxyhydroxide cathode is disclosed in commonly assigned patent application U.S. Ser. No. 10/228,957 filed Aug. 28, 2002, Pub. No. US2004/0043292A1. Such a cell generally produces less hydrogen gas and consequently has lower internal pressure after discharge than a conventional alkaline cell with a comparable zinc anode. Commonly assigned patent application U.S. Ser. No. 10/831,899, filed Apr. 26, 2004 discloses anode and cathode compositions for alkaline cells comprising zinc anode and nickel oxyhydroxide cathode related to compositions herein in the present application.

The prior art discloses rupturable vent membranes, which are integrally formed as thinned areas within the insulating disk included within the end cap assembly. Such vent membranes can be oriented such that they lie in a plane perpendicular to the cell's longitudinal axis, for example, as shown in U.S. Pat. No. 5,589,293, or they may be oriented so that they are slanted in relation to the cell's longitudinal axis as shown in U.S. Pat. No. 4,227,701. U.S. Pat. No. 6,127,062 discloses an insulating sealing disk and an integrally formed rupturable membrane, which is oriented vertically, that is, parallel to the cell's central longitudinal axis. When the gas pressure within the cell rises to a predetermined level the membrane ruptures thereby releasing the gas pressure to the external environment through apertures in the end cap.

Other types of vents are disclosed in the art for relieving gas pressure within an electrochemical cell. One such vent is a reseatable rubber plug, which has been used effectively in connection with small flat rectangular shaped nickel metal hydride rechargeable cells. One such rechargeable battery with the reseatable rubber plug vent is a 7/5-F6 size nickel metal hydride rechargeable battery available commercially as battery model GP14M145 manufactured by Gold Peak Batteries, Hong Kong. The rubber plug is physically compressed to sit tightly within a beveled aperture within a cavity or seat in the cell's end cap assembly. When the cell's internal gas pressure reaches a predetermined level, the plug lifts off its seat thereby letting gas to escape through the underlying aperture. The plug reseats itself when the gas pressure within the cell returns to normal. Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte.

The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide, for example, potassium hydroxide, sodium hydroxide, lithium hydroxide or a mixture thereof. The cathode can include a particulate metal oxide, for example, manganese dioxide, nickel oxyhydroxide or a mixture thereof, as the electrochemically active material admixed with an electrically conductive additive, typically a carbonaceous material, such as a graphitic carbon, for example, graphite to enhance the bulk electrical conductivity. Optionally, a small amount of a polymeric binder, for example, polyethylene or polytetrafluoroethylene, and other performance enhancing additives, such as a titanium-containing compound can be included in the cathode.

Suitable cathode active materials can be selected from a manganese dioxide, preferably an electrolytic manganese dioxide (EMD) made by direct electrolysis of an acidic solution of manganese sulfate; a nickel oxyhydroxide, for example, beta-nickel oxyhydroxide or gamma-nickel oxyhydroxide; and physical mixtures of electrolytic manganese dioxide and nickel oxyhydroxide. In general, the electrical conductivities of both EMD and nickel oxyhydroxide are relatively low. Therefore, an electrically conductive additive is included in the cathode mixture to improve electric conductivity between individual particles of the active cathode material as well as between particles of the active cathode material and the inner surface of the cylindrical cell housing that also serves as the cathode current collector. Suitable electrically conductive additives can include carbonaceous materials, for example, graphite, graphitic carbons, conductive carbon powders, such as carbon blacks, including acetylene black and petroleum coke. Desirably the conductive additive can be a graphitic carbon, for example, a flaky, highly crystalline natural graphite, a flaky, highly crystalline synthetic graphite, an expanded or exfoliated graphite, graphitized carbon fibers, carbon nanofibers, a fullerene or mixtures thereof. Preferably the graphitic carbon is an oxidation-resistant graphite.

There are small size rectangular shaped rechargeable batteries now available commercially, that can be used to power small electronic devices such as MP3 audio players and mini disk (MD) players. These batteries typically have a small cuboid (rectangular parallelepiped) shape and are similar in size to a package of stick-type chewing gum. The term "cuboid" as used herein shall mean its normal geometrical definition, namely, a "rectangular parallelepiped". Such batteries, for example, can be in the form of replaceable rechargeable nickel metal hydride (NiMH) size F6 or 7/5F6 size cuboids in accordance with the standard size for such batteries as set forth by the International Electrotechnical Commission (IEC). The F6 size has a thickness of 6.0 mm, width of 17.0 mm and length of 35.7 mm (without label). There is a version of the F6 size wherein the length can be as great as about 48.0 mm. The 7/5-F6 size has thickness of 6.0 mm, width of 17.0 mm, and length of 67.3 mm. According to the IEC standard, allowed deviation for the 7/5-F6 size in thickness is +0 mm, −0.7 mm, in width is +0 mm, −1 mm, and in length is +0, −1.5 mm. The average running voltage of the F6 or 7/5F6 NiMH rechargeable batteries when used to power miniature digital audio players such as an MP3 audio player or mini disk (MD) players is between about 1.1 and 1.4 volt typically about 1.12 volt.

When used to power a mini disk (MD) player, the battery is drained at a rate of between about 200 and 250 milliAmp. When used to power a digital audio MP3 player the battery is drained typically at a rate of about 100 milliAmp.

It would be desirable to have a small flat alkaline primary (i.e., non-rechargeble) battery of the same size and shape as the small size cuboid-shaped (i.e., rectangular parallelepiped) rechargeable nickel metal hydride batteries, so that the small size alkaline primary battery could be used interchangeably with a rechargeable nickel metal hydride battery to power small electronic devices such as mini disk players, MP3 players, and handheld games.

It would be highly desirable to use a small rectangular-shaped primary alkaline battery, preferably one having a cathode including nickel oxyhydroxide to replace small rectangular-shaped rechargeable batteries, particularly small nickel metal hydride rechargeable batteries.

For a given cell housing (casing) wall thickness, it will be appreciated that a rectangular-shaped cell housing is less able to withstand any increase in internal pressure of the cell (due to gassing and cathode expansion) than a cylindrical-shaped housing of comparable size and internal volume. This is due to the significantly greater circumferential stress (hoop stress) imposed on a rectangular (i.e., cuboid) shaped housing than on a similar size cylindrical housing for any given pressure and housing wall thickness. The problem of deformation (i.e., bulging or swelling) associated with rectangular-shaped cells can be overcome by significantly increasing the wall thickness of the housing. However, a significant increase in housing wall thickness can result in significant decrease in available volume for anode and cathode materials for rectangular cells having small overall thickness, e.g. under about 10 mm. The added wall thickness adds to the cost of manufacture of the cell. In this regard it is desirable to keep the housing wall thickness below about 0.50 mm, preferably less than about 0.47 mm.

Thus it is desired to design a small flat, primary (non-rechargeable) alkaline cell, such as an F6 or 7/5-F6 size cell having a rectangular (cuboid) shaped housing, but yet with small housing wall thickness, wherein the housing does not significantly bulge or swell during normal cell usage.

Thus, it is desired that such a rectangular-shaped primary alkaline cell be used as a replacement for a same size flat rechargeable nickel metal hydride cell.

SUMMARY OF THE INVENTION

A principal aspect of the invention is directed toward a primary (non-rechargeable) alkaline cell that can generate less hydrogen gas upon discharge than conventional alkaline cells, wherein said cell has an outer casing (housing), an end cap assembly including a vent mechanism to allow the hydrogen gas to escape from the cell when internal pressure of the cell reaches a predetermined level. The cell casing has at least one pair of opposing flat walls running along the cell's length.

The alkaline cell can have the shape of a parallelepiped, but desirably has the shape of a cuboid (i.e., rectangular parallelepiped). Preferably, the cell casing can be cuboid in shape, and does not include any integral cylindrical cross-sections. The alkaline cell desirably includes an anode comprising zinc-based particles, a cathode comprising nickel oxyhydroxide, and an alkaline electrolyte, preferably an aqueous potassium hydroxide solution.

In another principal aspect of the invention, the flat alkaline cell can include a cathode, comprising nickel oxyhydroxide (NiOOH), an anode, comprising zinc or a zinc-based alloy, a separator positioned between anode and cathode, and an alkaline electrolyte solution, comprising potassium hydroxide, contacting both anode and cathode.

In one aspect of the invention, the cathode comprises nickel oxyhydroxide, a conductive additive such as a graphitic carbon, preferably an oxidation-resistant graphite, and an aqueous alkaline electrolyte solution. Optionally, the cathode can include a polymeric binder, an oxidizing additive or combinations thereof. The cathode can include, for example, between 60% and 97% by weight, between 80% and 95% by weight, or between 85% and 90% by weight of nickel oxyhydroxide.

The nickel oxyhydroxide can include beta-nickel oxyhydroxide, cobalt oxyhydroxide-coated beta-nickel oxyhydroxide, gamma-nickel oxyhydroxide, cobalt oxyhydroxide-coated gamma-nickel oxyhydroxide, a mixture of beta-nickel oxyhydroxide and gamma-nickel oxyhydroxide or a mixture of cobalt oxyhydroxide-coated beta-nickel oxyhydroxide and cobalt oxyhydroxide-coated gamma-nickel oxyhydroxide. The nickel oxyhydroxide can be a powder including particles that are nominally spherical, spheroidal, or ellipsoidal in shape. The average particle size of the nickel oxyhydroxide powder can range between 2 and 50 microns, 5 and 30 microns, 10 and 25 microns or 15 and 20 microns. The nickel oxyhydroxide can include at least one bulk dopant. A bulk dopant can increase conductivity of the nickel oxyhydroxide as well as decrease its half-cell potential thereby decreasing open circuit voltage (OCV) of the cell.

In another aspect of the invention, the cathode can include an electrically conductive additive capable of enhancing bulk electrical conductivity of the cathode. Examples of suitable electrically conductive additives include conductive carbon particles, nickel powder, cobalt powder, cobalt oxide, cobalt oxyhydroxide, carbon fibers, carbon nanofibers, or combinations thereof. Carbon nanofibers are described, for example, in commonly assigned U.S. Ser. No. 09/658,042, filed Sep. 7, 2000 and U.S. Ser. No. 09/829,709, filed Apr. 10, 2001. More particularly, the cathode can include between 2 and 20 wt. %, between 5 and 15 wt. % or between 6 and 8 wt. % of conductive carbon particles. Conductive carbon particles can include graphitized carbon, carbon black, acetylene black or petroleum coke. The conductive carbon particles can have a variety of shapes including substantially spherical; elongated having one dimension substantially longer than the others; flake-like having two dimensions elongated relative to a third; and fibrous or thread-like. Preferably, the conductive carbon is a graphitized carbon. Graphitized carbon can include natural graphite, synthetic graphite, expanded graphite, graphitized carbon black, graphitic carbon nanofibers, fullerenes or mixtures thereof. Typically, natural and synthetic graphite particles can have a flake-like shape. Further, by including a graphitized carbon in the cathode at a relatively high level, for example, 6 to 10 wt. %, the capacity of cells discharged at low drain rates after storage can be increased by increasing the cathode efficiency.

In an alkaline cell including nickel oxyhydroxide as the active cathode material, it is preferable to use a natural or synthetic graphite that is oxidation-resistant. Typically, an oxidation-resistant graphite can be prepared by treating a high purity natural or synthetic graphite in an inert atmosphere at very high temperatures, for example, at temperatures greater than about 2500° C. or greater than about 3000° C. Cells with cathodes containing nickel oxyhydroxide can have an open circuit voltage (OCV) sufficiently high so as to oxidize alkaline electrolyte thereby generating oxygen gas. Oxidation of alkaline electrolytes by nickel oxyhydroxide is a well-known self-discharge process of charged nickel electrodes. The evolved oxygen gas can promote oxidation of the graphite present in the cathode thereby decreasing cathode conductivity and forming soluble potassium carbonate as a by-product. An increase in the carbonate ion concentration in the electrolyte can decrease ionic conductivity. Also, during storage at elevated temperatures, nickel oxyhydroxide can oxidize graphite directly.

In another aspect of the invention, it has been determined that use of an oxidation-resistant graphite in cells with cathodes including nickel oxyhydroxide can greatly reduce the extent of the undesirable self-discharge processes. In general, the oxidation resistance of a graphite can be determined by many contributing factors. For example, it is believed that the rate of graphite oxidation is at least partially related to the specific surface area of the graphite particles whereby the smaller the surface area, the more oxidation resistant the graphite. Similarly, oxidation resistance of a graphite can be at least partially related to the average particle size and the particle size distribution. Because larger size particles typically have lower surface areas, they can be more oxidation resistant. Also, oxidation resistance is believed to be related at least partially to the average crystallite size of the graphite particles as determined by x-ray diffraction, whereby the larger the crystallite size, the more oxidation-resistant the graphite. Further, it is believed that oxidation resistance also can depend at least partially on the relative number of surface defects or dislocations present in the graphite particles. Namely, the fewer the relative number of defects, the more oxidation-resistant the graphite.

In one aspect of the invention, the flat alkaline cell includes a cathode, an anode, a separator between anode and cathode and an alkaline electrolyte contacting both anode and cathode. The cathode preferably includes nickel oxyhydroxide and an oxidation-resistant graphite. The anode can include, for example, between about 60 and 80 wt. %, between about 62 and 75 wt. % or between about 62 and 72 wt. % of zinc-based particles comprising zinc or zinc alloy particles.

The term "zinc" as used herein shall be understood to include "zinc alloy" which comprises a very high concentration of zinc and as such functions electrochemically essentially as pure zinc. The zinc-based particles can have a mean average particle size, for example, between about 1 and 350 microns, desirably between about 1 and 250 microns, preferably between about 20 and 250 microns. Particle size and mean average particle size, as reported herein, unless otherwise specified, shall be construed to be that determined by the laser diffraction method. The zinc-based particles can be generally acicular, flake-like or spherical in shape.

In another principal aspect of the invention, a method for improving the discharge performance of a flat alkaline cell after storage includes providing a cathode including an active cathode material comprising nickel oxyhydroxide and a conductive additive comprising an oxidation-resistant graphite, an anode including zinc-based particles comprising zinc or zinc alloy, of which at least about 10 wt. % are 200 mesh in size or smaller, and forming a flat cell including the cathode and anode.

A flat zinc/nickel oxyhydroxide cell can have improved performance when discharged after storage at high temperature when zinc fines are included in the anode. As used herein, "zinc fines" are zinc particles small enough to pass through a sieve of 200 mesh size (i.e., a 200 mesh size corresponds to a sieve having square openings of 0.075 mm). Typically, zinc fines capable of passing through a 200 mesh sieve can have a mean average particle size of between about 1 and 75 microns. The inclusion of zinc fines in the anode of a flat zinc/NiOOH cell has been determined to improve discharge performance at high drain rates and unexpectedly, at low drain rates. It is believed that addition of zinc fines can improve electrical conductivity between the zinc-based particles and the current collector as well as increase the total surface area of the zinc-based particles in the anode. Since the rate capability of the nickel oxyhydroxide cathode is high, increasing the surface area of the zinc-based particles can decrease the effective current density (i.e., Amperes/cm$^2$) and improve rate capability of the zinc anode, thereby providing improved cell performance.

In addition to the substantial improvement in performance provided by adding zinc fines to the zinc anode, both continuous and intermittent discharge capacities of both fresh and stored zinc/NiOOH flat cells can be increased further by substituting an oxidation-resistant graphite for the conventional natural or synthetic graphite in the cathode. Also, an oxidation-resistant graphite can be included beneficially in the conductive coating applied to the inner surface the cell housing. Thus, the particular combination of an oxidation-resistant graphite in the cathode and zinc fines in the anode of the zinc/NiOOH flat cells is theorized to be particularly effective at delaying onset of polarization at both cathode and anode when the cell is discharged at high drain rates either continuously or intermittently, especially after extended storage at high temperatures before discharge. More specifically, by delaying onset of polarization of the zinc anode, the continuous as well as intermittent discharge capacities of both fresh cells and cells that have been stored for extended periods of time, for example, up to one year and even longer, can be increased substantially. Advantageously, the overall improvement in performance provided by the particular combination of zinc fines in the anode with nickel oxyhydroxide and an oxidation-resistant graphite in the cathode can be obtained without further modifying either anode or cathode such as by changing electrode composition, for example, by introducing other additives or dopants or by substantially increasing the design capacity of the zinc/NiOOH flat cell.

In another aspect, an end cap assembly including a venting mechanism and preferably a rectangular shaped metallic cover is used to close the open end of the cell casing after the cell contents are inserted into the casing. The end cap assembly is inserted into the open end of the cell casing and is sealed by crimping or welding to close the casing. The metallic cover can serve as the negative terminal if insulation or an insulating seal member, typically of nylon or polypropylene, is inserted between the edge of the cover and the casing edge and the edge crimped over the insulating seal member. Preferably, the cover can be laser welded directly to the edge of the cell casing. When the cover is laser welded to the casing edge, a plastic extender seal is stacked on top of the metal cover, a separate end cap that serves as the negative terminal is stacked in turn onto the plastic extender that is insulated from the cover, but in electrical communication with the anode. Alternatively, a paper washer can be substituted for the plastic extender. The cell casing serves as the cathode current collector as well as the positive terminal.

The cathode comprising nickel oxyhydroxide and oxidation-resistant graphite is inserted, preferably in the form of a plurality of compacted slabs or disks. The cathode slabs or disks are preferably rectangular shaped, each having a central hollow core running through the slab's thickness. The slabs are inserted so that they are stacked one on top of another. The slabs are aligned along the cell's length, so that their outside surface is in contact with the inside surface of the casing. The stacked cathode slabs form a central hollow core running along the cell's longitudinal axis. The central hollow core within the stacked cathode slabs forms the anode cavity. The inside surface of each cathode slab, which defines the central hollow core (anode cavity) within the slab, is preferably a curved surface. Such curved inside surface improves the mechanical strength of the slab during transfer and handling and also provides more uniform contact between the electrolyte permeable separator and the cathode. The separator is inserted into the central hollow core (i.e., anode cavity) so that the outside surface of the separator abuts and closely contacts the inside surface of the cathode. An anode slurry comprising zinc-based particles is inserted into the anode cavity with the separator providing the interface between anode and cathode. An elongated anode current collector in the end cap assembly is inserted into the anode slurry to provide electrical communication with the negative terminal. The end cap assembly has an insulating sealing member, that insulates the anode current collector from the cell casing.

The anode cavity preferably has an elongated or oblong configuration when the anode cavity is viewed in plan view upon taking a cross section of a cathode slab along a plane perpendicular to the longitudinal axis of the cell. The outer casing (housing) is desirably of steel, preferably of nickel-plated steel. The casing wall thickness is desirably between about 0.30 and 0.50 mm, typically between about 0.30 and 0.45 mm, preferably between about 0.30 and 0.40 mm, more desirably between about 0.35 and 0.40.

In one aspect a reusable or reactivatable vent, preferably, a reseatable plug vent mechanism may be employed as a primary vent mechanism. The reseatable plug is preferably designed to activate when the cell's internal gas pressure reaches a threshold level pressure $P1$ of between about 100 and 300 psig ($689.5 \times 10^3$ and $2069 \times 10^3$ pascal gage), desirably between about 100 and 200 psig ($689.5 \times 10^3$ and $1379 \times 10^3$ pascal gage).

In another aspect one or more spaced apart groove vents, preferably a single continuous groove vent (coined vent) comprising at least one stamped or scored region on the casing surface may be used as the primary venting mechanism. The groove vent can be stamped, cut or scored into the casing surface so that the underlying thinned region ruptures at pressure $P1$ between about 250 and 800 psig ($1724 \times 10^3$ and $5515 \times 10^3$ pascal gage). In such design the reseatable plug may be eliminated. Preferably, the groove vent is located in proximity to the closed end of the casing in proximity to the positive terminal. The groove boundary may be closed or open. The groove can be a straight or substantially straight, preferably parallel to a casing edge. The groove width is typically small, for example, under about 1 mm. However, the term "groove" or "groove vent" as used herein is not intended to be restricted to any particular width or shape, but rather encompasses any depression on the cell's casing resulting in a thinned underlying material region expected to crack or rupture when gas pressure within the cell reaches a target threshold level. By way of nonlimiting example, in a 7/5-F6 size rectangular cell, there may be a groove vent located on the casing wide face and parallel to a wide edge, preferably in proximity to the casing closed end. There may be a plurality of such groove vents, but desirably only a single groove vent, on a wide side of the casing and about 8 mm in length and about 5 to 10 mm from the closed end of the casing.

In such aspect of the invention the thinned material underlying the groove vent can be designed to rupture when gas pressure within the cell reaches a design burst pressure $P1$ of between about 250 and 800 psig ($1724 \times 10^3$ and $5515 \times 10^3$ pascal gage). To achieve such range in burst pressure between about 250 and 800 psig ($1724 \times 10^3$ and $5515 \times 10^3$ pascal gage), the thinned material underlying groove may have a thickness between about 0.04 and 0.15 mm. Alternatively, the thinned material underlying the groove vent can be designed to rupture when gas pressure within the cell reaches a design burst pressure of between about 400 and 800 psig ($2758 \times 10^3$ and $5515 \times 10^3$ pascal gage), desirably between about 400 and 600 psig ($2758 \times 10^3$ and $4136 \times 10^3$ pascal gage). To achieve a rupture pressure between 400 and 800 psig ($2758 \times 10^3$ and $5515 \times 10^3$ pascal gage) the thinned material underlying the groove may have a thickness between about 0.07 and 0.15 mm.

The groove vent may be made by stamping the casing surface with a die, preferably a die having a cutting knife edge. A mandrel is held against the inside surface of the casing as the stamping die punches into the casing outside surface. The groove can be conveniently cut in a V shape having equal length sides or in the V shape having unequal length sides. In the former case the sides forming the V shaped groove desirably form an acute angle of about 40 degrees and in the latter case they form an angle preferably between about 10 to 30 degrees.

In conjunction with the groove vent there may be a supplemental venting system comprising one or more laser welds securing the metal cover to the casing. Such welds may be comprise one or both a weak laser weld and a strong laser weld which may be designed to rupture at pressures higher than the rupture pressure $P1$ of the thinned region underlying the groove vent. Such laser welds are preferably made using a Nd:Yag laser.

In an aspect of the invention there may be just one laser weld, namely, a strong weld securing the entire circumferential edge of metal cover to the casing. The strong weld can function as the supplemental venting system designed to rupture under catastrophic conditions, for example, if the cell were inadvertently subjected to recharging under extremely high current or under extremely abusive conditions causing gas generation within the cell to rise abruptly to levels between about 800 psig and 2500 psig ($5515 \times 10^3$ and $17235 \times 10^3$ pascal gage).

Thus, in a preferred aspect there is at least a single groove vent stamped or cut onto the cell casing. The single groove vent functions may function as the cell's primary venting mechanism wherein the thinned material underlying the groove is designed to rupture if gas within the cell rises to a level between about 250 and 800 psig ($1724 \times 10^3$ and $5515 \times 10^3$ pascal gage), more typically between about 400 and 800 psig ($2758 \times 10^3$ and $5515 \times 10^3$ pascal gage). And there is in combination a supplemental venting system comprising a strong laser weld securing the edges of a metal cover to the casing. Such strong laser weld is designed to crack or rupture in the event of a catastrophic situation wherein gas within the cell rises abruptly to levels between about 800 psig and 2500 psig ($5515 \times 10^3$ and $17235 \times 10^3$ pascal gage). In such case gas within the cell will quickly escape through the rupture and the cell's internal pressure will immediately return to nominal levels.

In a specific aspect the flat alkaline cell has the overall shape of a small cuboid (rectangular parallelepiped), typically having an outside thickness between about 5 and 10 mm, particularly a thickness between about 5 and 7 mm. The outside thickness is measured by the distance between the outside surface of opposing sides of the housing defining the short dimension of the cell. In such embodiment the primary (nonrechargeable) alkaline cell of the invention can be used, for example, as a replacement for small size flat rechargeable cells. In particular such primary alkaline cell can be used as a replacement for same sized rechargeable nickel metal hydride cells, for example, the 7/5-F6 size rectangular rechargeable nickel metal hydride cell.

The amount of gassing and deformation of the cell casing (i.e., bulging) can be reduced by adjusting the cell balance in the case of the conventional zinc/$MnO_2$ chemistry. However, it has been determined that there is advantageously less gassing and accompanying deformation of the cell associated with a flat rectangular alkaline cell employing an anode comprising zinc fines and a cathode comprising nickel oxyhydroxide as compared to the same cell having an anode comprising zinc-based particles and a cathode comprising manganese dioxide. The term "substantially flat" as used herein is intended to include flat or nearly flat casing surfaces which have become deformed somewhat because of bulging, for example, due to cell gassing. Cell gassing in alkaline cells, in general, results from the reaction of zinc particles with water in the electrolyte to produce hydrogen gas. In the zinc/NiOOH cell any hydrogen gas generated is essentially consumed by the nickel oxyhydroxide and any oxygen from self-discharge of nickel oxyhydroxide is consumed by zinc-based particles in the anode to produce zinc oxide. Thus, one effect of including nickel oxyhydroxide in the cathode is a reduction in the internal gas pressure in the cell. In this regard, the flat rectangular alkaline cell employing a zinc anode comprising zinc fines and a nickel oxyhydroxide cathode can be balanced such that the ratio of the theoretical capacity (in mAmp-hr) of nickel oxyhydroxide (based on 292 mAmp-hr per gram NiOOH) divided by the theoretical capacity (in mAmp-hr) of zinc (based on 820 mAmp-hr per gram zinc) is about 1, for example, 0.98.

The zinc/NiOOH flat alkaline cell of the invention has an open circuit voltage (fresh) of between about 1.75 and 1.80 Volts and an average running voltage of about 1.5 Volts. It has a characteristic flat voltage profile during discharge for the life of the cell. It generally maintains the high flat voltage profile even at high drain rates. In this regard, it can provide a distinct advantage over zinc/$MnO_2$ flat alkaline cells with the same configuration (e.g. cuboid) in that it generally provides greater service life, over a wide range of low to high power applications and in particular, in high power applications.

BRIEF DESCRIPTION OF THE DRAWINGS

FIG. 3 is a cross sectional view of the cell shown in FIG. 1A taken along view lines 3-3.

FIG. 10 is a top plan view of the metal cover laser welded to the cell casing shown in FIG. 10A.

FIG. 10A is a side view of an embodiment of the flat alkaline cell showing a single grooved vent on a wide side of the casing.

FIG. 11 is cross sectional view along the wide side of the cell shown in FIG. 10A.

FIG. 14 shows fabrication of the separator for the cell of FIG. 10A from a single sheet of separator material.

FIG. 14A shows the process of forming a wrapped separator sheet.

FIG. 14B shows the finished wrapped separator having an open end and opposing closed end.

DETAILED DESCRIPTION

Figure 1:
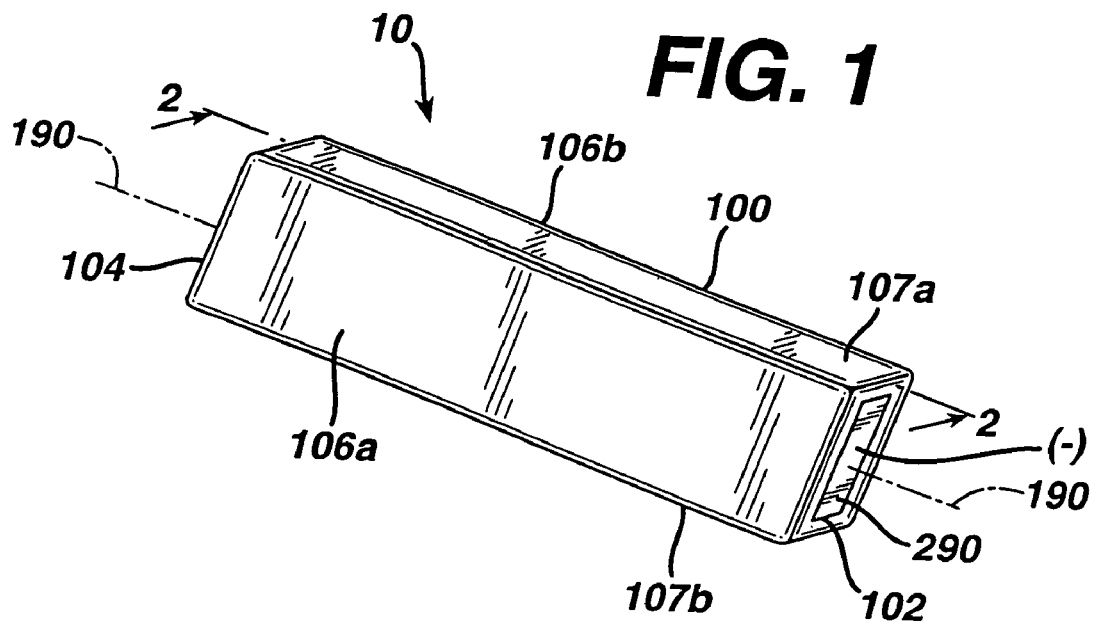
FIG. 1 is perspective view of the flat alkaline cell of the invention showing the cell's negative terminal end.

A specific embodiment of the flat alkaline cell 10 of the invention is shown in FIGS. 1-5. Cell 10 has at least two flat opposing sides, which are parallel to the cell's longitudinal axis. Cell 10 is preferably of rectangular shape, that is, a cuboid, as shown best in FIGS. 1 and 1A. The term "cuboid" as used herein shall mean the geometrical definition, which is a rectangular parallelepiped. However, cell 10 can also be a parallelepiped. Outer casing 100 as shown in the figures preferably is of cuboid shape, thus without having any integral cylindrical sections. Cell 10 typically has a thickness smaller than its width and a width smaller than its length. When cell thickness, width, and length are of different dimensions, the thickness will normally be considered the smallest of these three dimensions.

The cell 10 preferably comprises a cuboid shaped casing (housing) 100, preferably of nickel-plated steel. The inside surface of casing 100 can be coated with a layer of a solvent-based conductive carbon coating, for example, available under the trade designation TIMREX® E-LB. In the embodiment shown in the figures, casing 100 is bounded by a pair of opposing large flat walls 106a and 106b; a pair of opposing small flat walls 107a and 107b; a closed end 104; and opposing open end 102. The cell's thickness is defined by the distance between the outside surfaces of walls 106a and 106b. The cell's width is defined by the distance between the outside surface of walls 107a and 107b. Casing 100 is desirably coated on its inside surface with a layer of carbon or indium to improve conductivity. Cell contents comprising anode 150, cathode 110 and separator 140 therebetween are supplied through the open end 102. In a preferred embodiment the anode 150 comprises particulate zinc and the cathode 110 comprises nickel oxyhydroxide. An aqueous solution of potassium hydroxide forms a portion of the anode and cathode.

Figure 2:
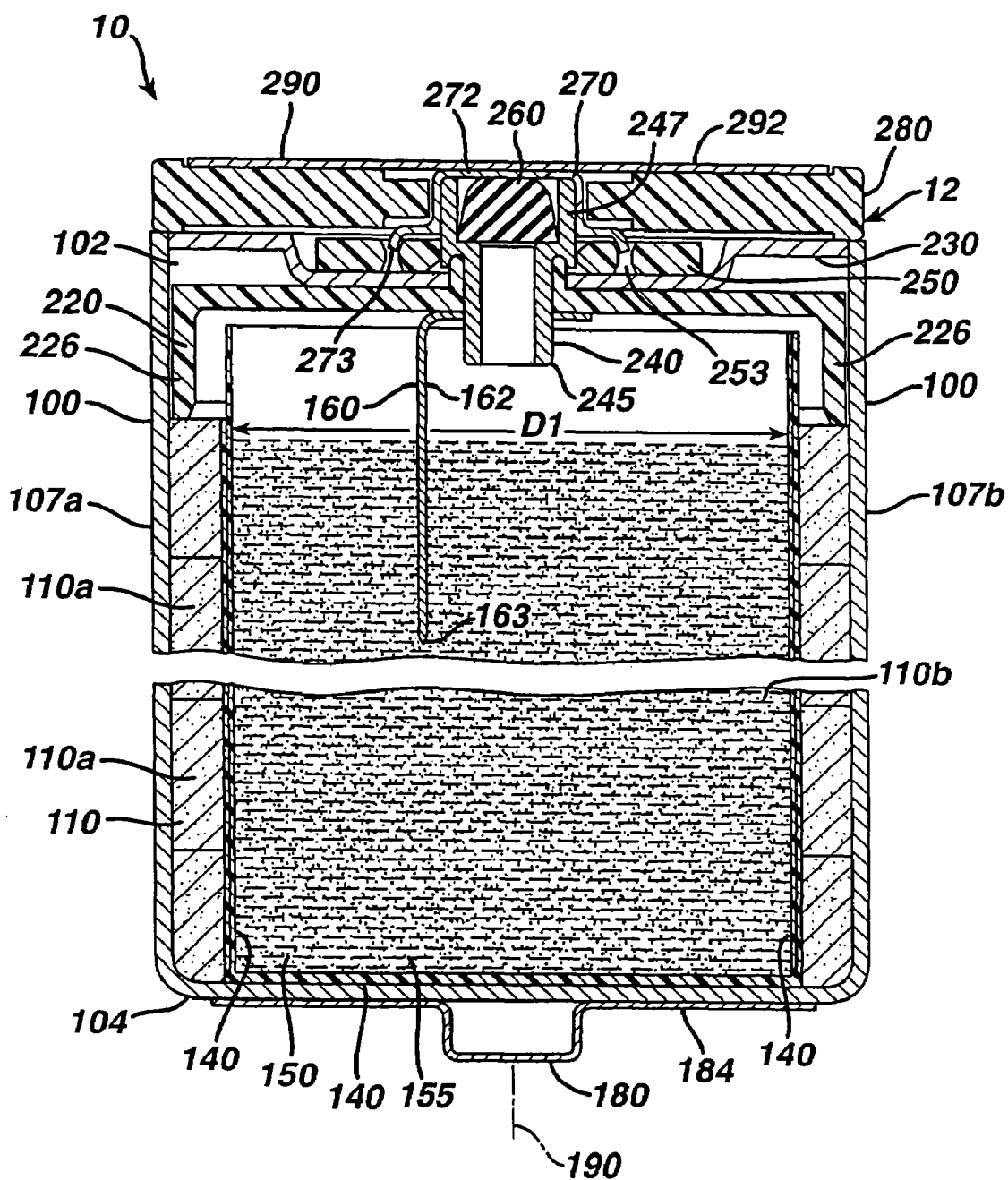
FIG. 2 is a cross sectional view of the cell shown in FIG. 1A taken along view lines 2-2.
Figure 5:
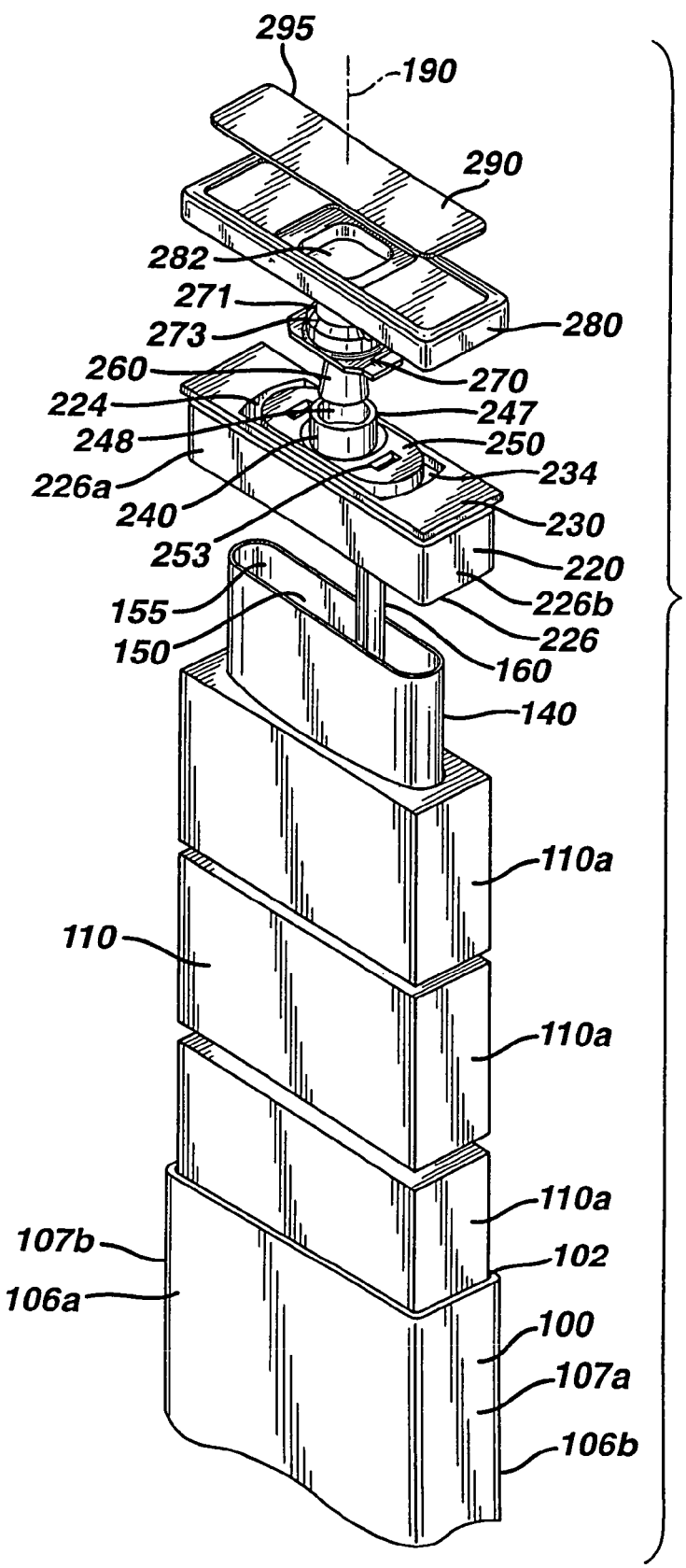
FIG. 5 is an exploded view showing installation of the cell contents and end cap assembly into the cell casing.

The cathode 110 may be in the form of a plurality of slabs (disks) 110a having a hollow central core 110b through its thickness, shown best in FIG. 5. The cathode slabs 110a preferably are of overall rectangular shape. The cathode slabs 110a are inserted into casing 100 and stacked vertically one on top of the other along the cell's length as shown in FIGS. 2, 3 and 5. Each cathode slab 110a may be recompacted after it is inserted into casing 100. Such recompaction assures that the outside surface of each cathode slab 110a is in intimate contact with the inside surface of casing 100. Preferably, the hollow central cores 110b within cathode slabs 110a are aligned to form one continuous central core along the cell's longitudinal axis 190, for receiving anode slurry 150. Optionally, the cathode slab 110a closest to the closed end 104 of casing 100, can have a bottom surface which abuts and covers the inside surface of closed end 104.

Cathode slabs 110a can be die cast or compression molded. Alternatively, cathode 110 can be formed of cathode material which is extruded through a nozzle to form a single continuous cathode 110 having a hollow core. Cathode 110 can also be formed of a plurality of slabs 110a with hollow core 10b, wherein each slab is extruded into casing 100.

After cathode 110 is inserted, an electrolyte permeable separator 140 is then positioned within central core 110b of each slab 110a so that the outside surface separator 140 abuts the inside surface of the cathode as shown in FIGS. 2, 3, and 5. The inside surface of each cathode slab 110a, which defines said hollow central core 110b, is preferably a curved surface. Such curved inside surface improves the mechanical strength of the slab during transfer and handling and also provides more uniform contact between the separator 140 and the cathode 110.

The central core 110b of slabs 110a are aligned to form one continuous core as above described. After separator 240 is inserted, the continuous core forms the anode cavity 155 for housing anode material 150. The anode cavity is within the central core of cathode slab 110a which is devoid of cathode material. The anode cavity 155 has an elongated or oblong shape when viewed in plan view (FIG. 4B) upon taking a cross section of a cathode slab 110a along a plane perpendicular to the cell's longitudinal axis 190. The cross section of the anode cavity 155 defined by boundary perimeter 156 may be elliptical or substantially elliptical. Cavity 155 has a long dimension D1 which is greater than its short dimension D2. Cavity 155 thus can have a diameter (or width), D1, which is greater along the path of a plane parallel to the wide side (106a or 106b) of the cell than its diameter (or width), D2, in the direction of a plane parallel to a narrow side (107a or 107b) of the cell. Thus, by way of nonlimiting example, anode cavity 155 may take the shape of an ellipse or appear to be substantially elliptical when viewed in cross section along a plane perpendicular to the central longitudinal axis 190. The opposing long boundary edges 158a and 158b of the anode cavity when viewed in cross section (FIG. 4B) may be flat or substantially flat so that the overall configuration is not a perfect ellipse, but nevertheless is of an elongated or oblong shape as shown.

The cavity 155 has an elongated or oblong shape when viewed in cross section (FIGS. 4B, 4C and 4D) obtained by cutting a cathode slab 110a by a plane perpendicular to the cell's central longitudinal axis 190. Such elongated shape can be an elongated polygon or a rectangular shape as shown in FIG. 4C. The axes defining the long dimension D1 and short dimension D2 of cavity 155 defined by boundary perimeter 156 may be skewed as shown in FIG. 4D. Preferably, the cavity 155 when viewed in cross section (FIG. 4B) obtained by cutting a cathode slab 110a by a plane perpendicular to the cell's central longitudinal axis 190 (FIG. 1A) has at least a portion of its boundary perimeter 156 which is curved. Cavity 155 is desirably of an oblong configuration. In a preferred embodiment substantially all of the boundary perimeter 156 defining cavity 155 is curved. In particular it is desirable that at least the opposing surfaces 157a and 157b of cavity 155 closest to the opposing narrow sides 107a and 107b of the cell are curved as shown best in FIG. 4B. Preferably, substantially all of the perimeter 156 of cavity 155 when viewed in cross section as above described is curved. The opposing long edges 158a and 158b are preferably outwardly curved (convex) when viewed from outside casing 100 as shown in FIG. 4B. However, long edges 158a and 158b may be flat or substantially flat. Alternatively, long edges 158a and 158b may be slightly inwardly curved (concave) or lightly outwardly curved (convex) or may be of convoluted curvature, for example having alternating convex and concave surfaces. Similarly the short edges 157a and 157b may be slightly inwardly curved (concave) or lightly outwardly curved (convex) or may be of convoluted curvature, for example, having alternating convex and concave surfaces. In any cross section of a cathode slab 110a taken along a plane perpendicular to the cell's longitudinal axis, there is a long dimension D1 of cavity 155 representing its maximum length within the plane and the short dimension D2 representing its maximum width within said plane. The long diameter (D1) will normally be in the direction along a plane parallel to a wide side (106a or 106b) of the cell and the small diameter (D2) is in the direction along a plane parallel to a narrow side (107a or 107b) of the cell as shown in FIG. 4B. Cavity 155 when viewed in cross section as above described has at least some curvature and is characterized in that the ratio of D1/D2 is greater than 1.0 reflecting that it is of elongated or oblong configuration. The shape of the cavity 155 when viewed in a cross section taken along a plane perpendicular to longitudinal axis 190 desirably has a symmetrical oblong configuration having a ratio of D1/D2 greater than 1.0. In such case the dimensions D1 and D2 are perpendicular to each other as shown in FIG. 4B. By way of a specific nonlimiting example, the shape of cavity 155 in when viewed in such cross section is of oblong shape and may be elliptical or substantially elliptical.

Anode 150, is preferably in the form of a gelled zinc slurry comprising zinc-based particles and aqueous alkaline electrolyte. The anode slurry 150 is poured into the central core 155 of the cell along the cell's longitudinal axis 190. Anode 150 is thus separated from direct contact with cathode 110 by separator 140 therebetween.

Figure 1A:
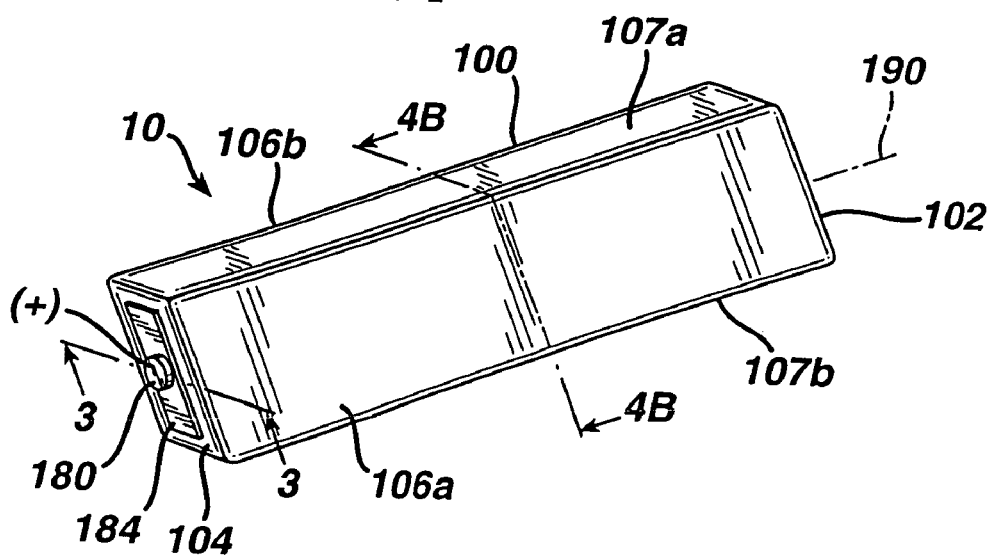
FIG. 1A is a perspective view of the flat alkaline cell of FIG. 1 showing the cell's positive terminal end.

After the cell contents are supplied, the cell assembly 12 (FIG. 4) is then inserted into the open end 102 to seal the cell and provide a negative terminal 290. The closed end 104 of the casing can function as the cell's positive terminal. The closed end 104 can be drawn or stamped to provide a protruding positive pip or else a separate end plate 184 having a protruding pip 180 can be welded to the closed end 104 of the casing as shown in FIG. 1A.

Figure 4:
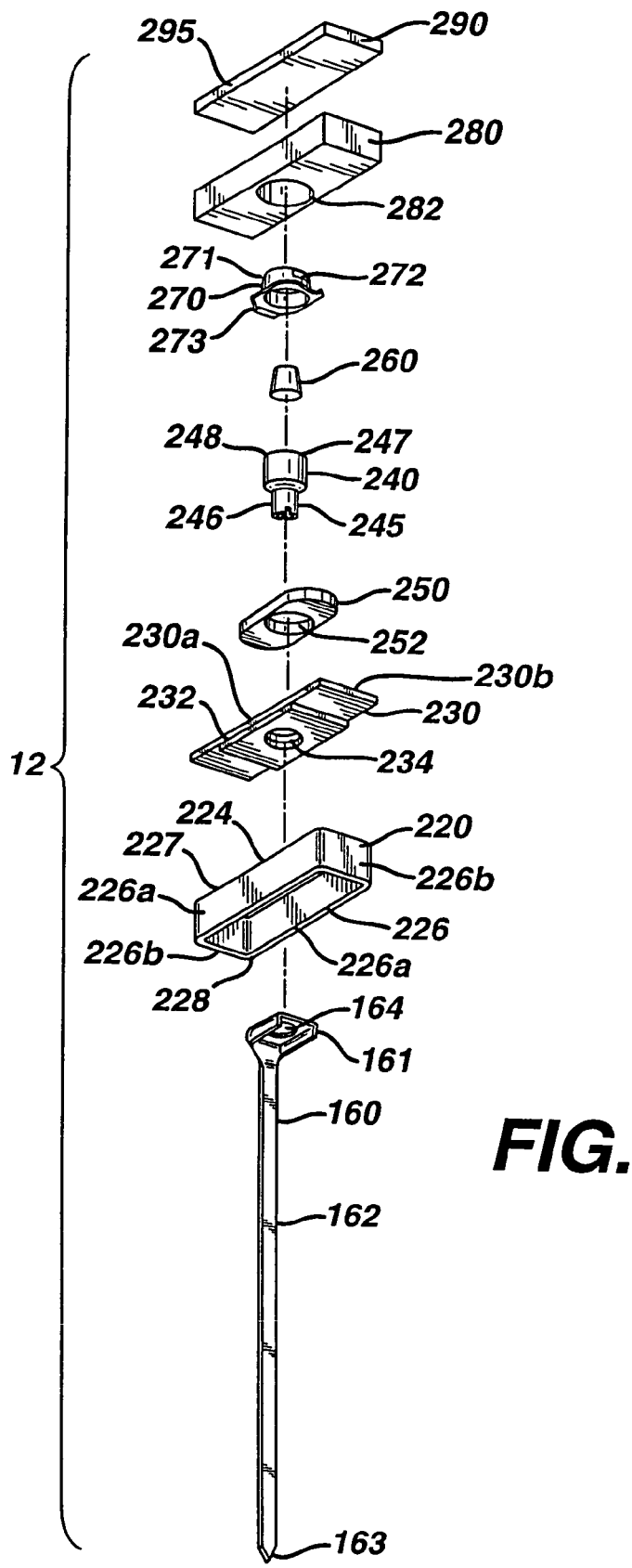
FIG. 4 is an exploded view of the components comprising the end cap assembly for the flat alkaline cell.

The components comprising a specific embodiment of the end cap assembly 12 are shown best in FIG. 4. End cap assembly 12 comprises an elongated anode current collector 160; an insulating sealing member 220; a metal cover 230 which lies over sealing member 220; a metal rivet 240 which penetrates partially through insulating sealing member 220; a plastic spacer 250, which insulates rivet 240 from metal cover 230; a rubber vent plug 260 seated within a cavity 248 in rivet 240; a vent pip cap 270 over rubber plug 260; a plastic extender seal 280; and a negative terminal plate 290 over plastic extender 280.

It is herein acknowledged that rubber vent plug 260 as seated within a cavity 248 within a rivet 240, and vent pip cap 270 over rubber plug 260 have been disclosed and used in connection with a commercial 7/5-F6 size rectangular rechargeable nickel metal hydride battery Model No. GP14M145 made by Gold Peak Batteries, Hong Kong. However, Applicants of the present patent application herein have determined that the end cap assembly as a whole in said nickel metal hydride rechargeable battery Model No. GP14M145 causes corrosion and promotes gassing if applied to a conventional alkaline primary cell, for example, a zinc/$MnO_2$ alkaline cell. Such corrosion was found to occur between the elongated current collector and the inside surface of the cell housing because the widest part of the current collector was very close (less than about 0.5 mm) to the cell housing inside surface. It will be appreciated that a wide portion, namely flange 161, of current collector 160 is employed in connection with the reseatable vent plug design. Such wide portion of the current collector (flange 161) is required because the current collector is riveted to the underside of insulating sealing member 220. Thus, flange 161 must be sufficiently wide to fasten base 246 of rivet 240 thereto. If the cell 10 is a small size flat cell, for example a cuboid shaped cell having an overall thickness between about 5 and 10 mm, an edge of flange 161 will, therefore, terminate close to an inside surface of casing 100.

Applicants have modified the subassembly comprising current collector 160 and insulating sealing member 220 by redesigning the insulating sealing member 220 to provide it with a circumventing skirt 226. The insulating sealing skirt 226 surrounds the widest part, namely flange 161 of anode current collector 160. Insulating skirt 161 thus provides a barrier between the edge of current collector flange 161 and the inside surface of casing 100. The insulating skirt 161 has been determined to reduce the production of corrosive chemicals, typically metal containing complexes or compounds, in the space between flange 161 and the inside surface of casing 100 during cell discharge. Such corrosive chemicals, if produced in quantity, can interfere with cell performance and promote cell gassing. Also, in the modified design herein described the widest part of the anode current collector 160, namely, flange 161 is between about 0.5 and 2 mm, preferably between about 0.5 and 1.5 mm from the housing inside surface. This in combination with the use of insulating sealing skirt 226 surrounding current collector flange 161 was determined to prevent the production of any significant amount of corrosive chemicals between current collector wide portion (flange 161) and the casing 100 inside surface. Such modified design of the invention in turn made the reseatable rubber vent plug assembly suitable as a viable vent mechanism for the flat primary alkaline cell herein described.

The components of the end cap assembly 12 shown best in FIGS. 4 and 5 can be assembled in the following manner: The anode current collector 160 comprises an elongated shaft or wire 162 terminating at its bottom end in tip 163 and terminating at its top end in an outwardly extending integral flange 161, which is preferably at right angles to shaft 162. Thus when the current collector 160 is inserted into anode 150, the edge of outwardly extending flange 161 can be closer to the inside surface of casing 100 than shaft 162. Insulating sealing member 220 has a top panel 227 and opposing open bottom 228. Insulating sealing member 220 is preferably of nylon 66 or nylon 612, which is durable, resistant to alkaline, and permeable to hydrogen. Alternatively, insulating sealing member 220 may be composed of polypropylene, talc filled polypropylene, sulfonated polyethylene or other polyamide (nylon) grades, which are durable and hydrogen permeable. Insulating member 220 is preferably rectangular so that it can fit snugly within the open end 102 of casing 100. The opposing side walls 226a and opposing end wall 226b extending from top end 227 of insulating member 220 forms a downwardly extending skirt 226 around top panel 227. Skirt 226 defines the bounds of open bottom 228 of said insulating sealing member 220. There is an aperture 224 through the top panel 227. There is a metal cover 230 which can be a metal plate having an aperture 234 therethrough. There is a metal rivet 240 having a head 247 and base 245. Rivet 240 can be of nickel plated steel or stainless steel. Rivet 240 has a cavity 248 within head 247. Cavity 248 passes completely through rivet head 247 and the rivet shaft 245. The flange 161 of current collector 160 is inserted into the open bottom 228 of insulating sealing member 220 so that the flange 161 of the current collector 160 is surrounded and protected by insulating skirt 226 of said sealing member 220. As shown in FIG. 4, flange portion 161 of current collector 160 has an aperture 164 therethrough. The base 246 of rivet 240 can be passed through said aperture 164 and riveted to said flange 161 to keep the current collector 160 in electrical contact with said rivet. In such embodiment insulating skirt 226 provides a barrier between flange 161 of the current collector and the inside surface of the cell's casing 100. It has been determined that narrow gaps, for example, less than about 0.5 mm, between any surface of the anode current collector 160 and the cell's casing 100 inside surface can provide regions in which corrosive by-products can occur during conventional alkaline cell discharge. This in turn can passivate neighboring regions of the anode current collector 160 and promote gassing. The downward extending skirt 226 of insulating sealing member 220 is intended to surround outwardly extending portions of the current collector 160 such as integral flange 161, thereby providing a barrier between the widest portions of the current collector 160 and casing 100. This has been determined to resolve the corrosion problem and reduce gassing. Applicant has modified the design by redesigning the widest part of the current collector preferably by providing a barrier, namely an insulating skirt 226 surrounding the widest part, namely flange 161 of anode current collector 160. The placement and effect of skirt 226 are described in greater detail in the following paragraphs herein. In Applicant's modified design herein described the widest part of the anode current collector 160, namely flange 161, is between about 0.5 and 2 mm, preferably between about 0.5 and 1.5 mm from the housing inside surface. Also, circumventing insulating skirt 226 provided a barrier between current collector flange 161 and casing 100. These design features were determined to resolve the corrosion problem and make the reseatable rubber vent plug assembly suitable as a viable vent mechanism for the flat primary alkaline cell of the invention.

In forming end cap assembly 12, the flange portion 161 of current collector 160 is positioned so that aperture 164 therethrough is aligned with aperture 224 through top panel 227 of the insulating sealing member 220. The metal cover 230 is positioned over the top panel 227 of the insulating sealing member 220 so that aperture 234 through metal cover 230 is aligned with aperture 224. A plastic spacer disk 250 is inserted over metal cover 230 so that the aperture 252 through spacer disk 250 is aligned with aperture 234 of metal cover 230. In the preferred embodiment (FIG. 4), the base 246 of rivet 240 is passed through aperture 252 of plastic spacer 250 and also through aperture 234 of metal cover 230. Base 246 of rivet 240 is also passed through aperture 224 of insulating sealing member 220 and aperture 164 of current collector flange 161. Plastic spacer 250 insulates rivet 240 from metal cover 230. The base 246 of rivet shaft 245 extends through aperture 224 of the insulating sealing member 220 and underlying aperture 164 within the top flange portion 161 of anode current collector 160. Base 246 of the rivet shaft can be hammered into place against the bottom surface of current collector flange 161 using an orbital riveter or the like. This locks the rivet shaft in place within aperture 224 of the insulating sealing member 220 and also secures the current collector 160 to the rivet shaft 245. This keeps the current collector 160 in permanent electrical contact with rivet 240 and prevents the rivet shaft 245 from being removed or dislodged from aperture 224 of the insulating sealing member 220. The rivet head 247 is tightly seated over plastic spacer 250. This forms a subassembly comprising rivet 240, plastic spacer 250, metal cover 230, insulating sealing member 220 and anode current collector 160. The subassembly can be stored until ready for further assembly.

The assembly process is completed by inserting rubber vent plug 260 into cavity 248 within the rivet head 247. Plug 260 is preferably in a truncated conical shape and is designed to fit snugly within cavity 248 of rivet head 247. Plug 260 is preferably of a compressible, resilient material which is resistant to alkaline electrolyte. A preferred material for plug 260 is a rubber, preferably a neoprene or EPDM (ethylene-propylene diene terpolymer) rubber or other alkaline resistant compressible rubber. The surface of the plug 240 is preferably coated with a nonwetting agent such as Teflon (polytetrafluoroethylene), asphalt or a polyamide. A metal vent pip cap 270 is then inserted over plug 260. The vent pip cap 270 is pressed onto plug 260 with force sufficient to compress the plug by about 0.55 mm. This has been determined to provide a seal which can withstand internal gas pressure buildup of about 200 psig ($13.79 \times 10^5$ pascal). Plug 260 compression can be adjusted so that the seal can withstand internal pressures typically between about 100 and 300 psig ($6.895 \times 10^5$ and $20.69 \times 10^5$ pascal gage), desirably between about 100 and 200 psig ($6.895 \times 10^5$ and $13.79 \times 10^5$ pascal gage). Higher degree of compression of plug 260 is also possible, if desired, to enable the seal to withstand higher pressures, that is, higher than 300 psig ($20.69 \times 10^5$ pascal gage). Conversely reduced compression of plug 260 is possible, if desired, so that the seal is maintained up to a pressure thresholds at any desired value below 100 psig. The base 273 of vent pip cap 270 can have several downwardly extending segments which fit into indentations or crevices 253 within the top surface of plastic spacer 250 as vent cap 270 is pressed onto plug 260. This is shown best in FIG. 5. After vent pip cap 270 is inserted over plug 260, thereby compressing said plug within rivet head cavity 248, vent cap 270 is welded to rivet head 247. Plug 260 is thereby maintained compressed within rivet head cavity 248. The plastic extender member 280 is placed over the vent cap head 271. The vent cap head 271 protrudes through aperture 282 within plastic extender 280. A terminal end plate 290 (negative terminal), is then welded to vent cap head 271. Vent cap 270 is thus welded to both end plate 290 and rivet 240. Terminal end plate 290 is constructed of a conductive metal having good mechanical strength and corrosion resistance such as nickel plated cold rolled steel or stainless steel, preferably, nickel plated low carbon steel. Thus, a completed end cap assembly 12 is formed with terminal end plate 290 in permanent electrical contact with current collector 163.

The completed end cap assembly 12 is then inserted into the open end 102 of casing 100. The current collector shaft 162 penetrates into anode slurry 150. The edge of metal cover 230 is welded, preferably by laser welding, to the top peripheral edge 104 of the casing. This holds the end cap assembly 12 securely in place and seals the open end 102 of the casing as shown in FIGS. 1 and 1A. End terminal plate 290 is in electrical contact with current collector 160 and anode 150, and thus forms the cell's negative terminal for the zinc/NiOOH alkaline cell embodiment described herein. It will be appreciated that the negative terminal plate 290 is electrically insulated from casing 100 by plastic extender 280. Rivet 240 and anode current collector 160 is electrically insulated from casing 100 by plastic spacer 250 and insulating sealing member 220. As shown in FIGS. 1A, 2 and 3, pip 180 at the opposing closed end of casing 100 forms the cell's positive terminal. The pip 180 can be integrally formed from the closed end 104 of the casing or may be a formed of a separate plate 184, which is separately welded to the closed end as shown in FIG. 1A. The completed cell is shown in the perspective views of FIGS. 1 and 1A and in cross sectional views of FIGS. 2 and 3.

In operation during cell discharge or storage, if the gas pressure within the cell builds up to exceed the design threshold level, plug 260 becomes unseated within rivet head cavity 248. This will allow gas to escape from within the cell interior through rivet head cavity 248, then through vent aperture 272 of vent cap 270 and to the external environment. As pressure within the cell is reduced, plug 260 becomes reseated within rivet head cavity 248.

As an added safety feature the cell can be provided with a second venting device which functions to supplement the reseatable plug vent 260. The supplemental vent may be designed to activate in a catastrophic situation, for example, if the user inadvertently attempts to recharge primary cell 10 for long periods of time using battery chargers designed for flat rechargeable cells. The cell 10 of the invention is designed to be a primary (nonrechargeable cell). Despite ample written notice on the cell label that the cell should not be recharged, it is always possible that the user will inadvertently attempt to recharge the cell in a conventional flat battery charger, for example, one designed for recharging a flat nickel metal hydride cell. If the cell is abused in this manner by attempting to recharge for a long period of time, there is risk that the internal pressure level could rise abruptly.

If cell 10 is inadvertently subjected to recharging (although it is intended as a primary non-rechargeable cell), plug vent 260 will unseat thereby releasing pressure as the internal gas pressure reaches the design threshold, desirably a pressure between about 100 and 300 psig ($6.895 \times 10^5$ and $20.69 \times 10^5$ pascal gage). Plug 260 will unseat again should the pressure again build up upon continued charging for long periods of time. Such process of plug unseating and reseating can be repeated many times resulting in a pulsed release of gas pressure from the cell interior. Under such abuse conditions there is the chance that KOH electrolyte will gradually enter and crystallize within the free space between the plug 260 and the inside surface of rivet head cavity 248 housing plug 260. (Plug 260 is held compressed within rivet head cavity 248 by vent cap 270 which is welded to the rivet head). The accumulation of such crystallized KOH reduces the amount of free space between plug 260 and the inside surface of vent cap 270. This can make it gradually more difficult for the plug 260 to properly unseat as the recharging process is continued, since there may be less free space available for plug 260 to expand into when the threshold gas pressure is reached. Accumulation of crystallized KOH within a small amount of free space within rivet head 248 can also impede proper venting of gas through vent aperture 272 in vent cap 270.

Several improvements in design are proposed herein in order to reduce the deleterious effect of such KOH crystalline buildup between plug 260 and the inside surface of vent cap 270:

The venting system of the invention may include primary and supplemental venting mechanisms. The primary venting mechanism is activated when gas pressure within the cell builds up to a design pressure threshold level, P1. It is desirable to have a supplemental venting mechanism which activates at a higher pressure level, P2, in the event that the primary vent mechanism fails to operate properly or if the cell is subjected to an abusive situation resulting in a rapid build up of gas pressure. One such abusive situation could occur, for example, if the cell were subjected inadvertently to charging for an extended period. In one specific embodiment of the invention a reseatable plug 240 is employed as a primary venting mechanism, which activates at a design threshold pressure P1, between about 100 and 300 psig. A supplemental venting mechanism can be a weak laser weld anywhere within a cut out portion of the casing body 100 or end cap assembly 12. The weak laser weld is designed to rupture when gas pressure within the cell reaches a higher pressure P2, desirably between about 400 and 800 psig. There may be a strong weld, preferably contiguous with the weak weld. The strong weld is designed to rupture at yet a higher pressure P3, desirably between about 800 and 2500 psig.

Figure 6:
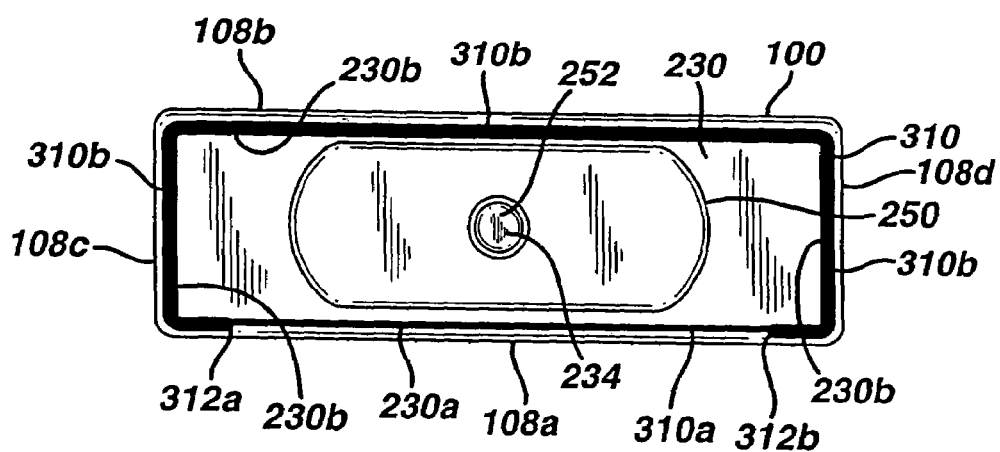
FIG. 6 is a plan view of a metal cover plate shown laser welded along its edge with a strong weld and a weak weld to the inside surface of the cell's casing.

One embodiment of the supplemental venting system can be provided by forming a weak laser weld along a portion of the laser welded interface between the metal cover 230 and inside surface of casing 100. (Metal cover 230 is used to close the open end 102 of casing 100.) Preferably, a weak laser weld 310a can be applied between a major portion of one of the metal cover long edges 230a and casing edge 108a as shown in FIG. 6. The weak laser weld 310a can be applied so that the weld thickness is such that it will crack or rupture desirably as gas within the cell builds up to a pressure of between about 400 and 800 psig ($2748 \times 10^3$ and $5515 \times 10^3$ pascal). The depth of penetration of the weak weld can be adjusted to achieve the desired rupture pressure. A rupture pressure between about 400 and 800 psig ($2748 \times 10^3$ and $5515 \times 10^3$ pascal gage) can be achieved with a depth of penetration of the laser weld between about 2 and 4 mil (0.0508 and 0.102 mm). The weak weld may desirably run along a major portion of at least one of the long edges 230a of metal cover 230. Preferably, the weak weld begins at a point 312a which is at least about 1 mm from the corner intersecting short edge 108c and long edge 108a of casing 100. Thus, for a flat 7/5-F6 cell the length of the weak weld may be at least about 10 mm, typically about 13 mm.

The remainder of the perimeter interface between the edge of metal cover 230 and the casing edge (casing edges 107c, 107d, and 106d) (FIG. 6) can be provided with a strong laser weld 310b designed to rupture at a higher pressure level, for example, a gas pressure between about 800 and 2500 psig ($5515 \times 10^3$ and $17235 \times 10^3$ pascal gage), typically between about 800 and 1600 psig ($5515 \times 10^3$ and $11030 \times 10^3$ pascal gage). The depth of penetration of the strong weld can be adjusted to achieve the desired rupture pressure. A rupture pressure between about 800 and 2500 psig ($5515 \times 10^3$ and $17235 \times 10^3$ pascal gage) can be achieved with a depth of penetration of the laser weld between about 5 and 7 mil (0.127 and 0.178 mm). The depth of penetration of the strong weld can be more finely adjusted allowing the weld to rupture at a desired pressure level, for example, between about 1300 and 1600 psig ($8962 \times 10^3$ and $11030 \times 10^3$ pascal gage).

Figure 6A:
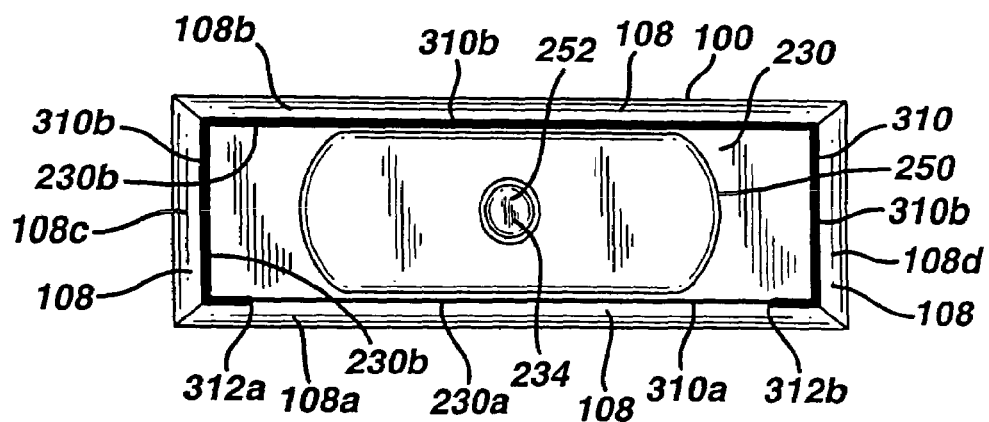
FIG. 6A is a plan view of a metal cover plate shown laser welded along its edge with a strong weld and a weak weld to the crimped edge of the cell's casing.

Although the edge of metal plate 230 is shown welded to the inside surface of metal casing 100 as shown in FIG. 6, there can be alternative embodiments wherein the edge of metal plate 230 is welded to an edge of metal casing instead of the inside surface of casing 100. One such alternative embodiment is shown in FIG. 6A. In such embodiment (FIG. 6A) the casing edge 108 defined by opposing long edges 108a and 108b and opposing short edges 108c and 108d are crimped so that such edges lie in about the same plane as metal plate 230. Thus, the edges 230a and 230b of metal plate 230 can be laser welded directly to the crimped casing edge 180. A strong laser weld 310b can be applied between plate edge 230b and casing edges 108b, 108c, and 108d; a weak laser weld 310a can be applied between plate edge 230a and casing edge 108a.

Figure 7:
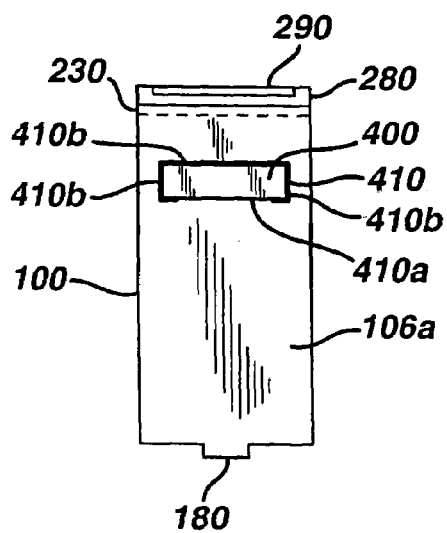
FIG. 7 is a view of the cell casing body showing an embodiment of strong and weak welds therein.
Figure 7A:
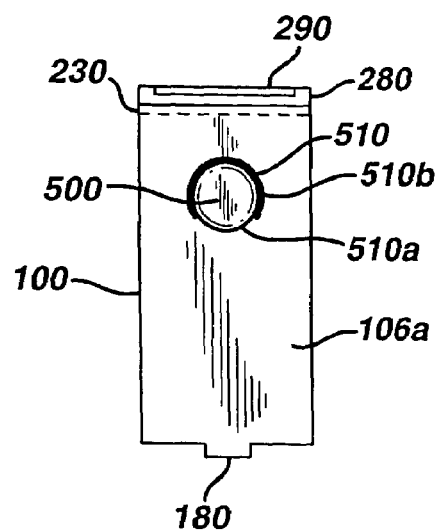
FIG. 7A is a view of the cell casing body showing an embodiment of curved strong and weak welds therein.

In yet other embodiments there can be cut out portions within the body of casing 100. The cut out portion may be of varying shape. For example, the cut out portion may be polygonal (FIG. 7) or may have at least a portion of its boundary curved (FIG. 7A). A metal plate, e.g. plate 400 (FIG. 7) or plate 500 (FIG. 7A) may by inserted into such cut out portions. The edges of metal plate 400 (FIG. 7) or metal plate 500 (FIG. 7A) may be laser welded to the casing to close the cut out portion. The welds may desirably be in the form of a strong laser weld 410b and a contiguous weak laser weld 410a as shown in the embodiment of FIG. 7. The welds may in the form of a strong laser weld 510b and preferably a contiguous weak laser weld 510a as shown in the embodiment of FIG. 7A.

The strong and weak welds can be achieved using different types of lasers operating within a range of peak power output. The following are nonlimiting examples of a weak and strong welds produced using a Nd:Yag laser. The weak weld as above described will crack or rupture as above described when gas pressure within the cell reaches a threshold pressure of between about 400 and 800 psig ($2758 \times 10^3$ and $5515 \times 10^3$ pascal gage). The strong weld will rupture when the gas pressure within the cell reaches a threshold pressure of between about 800 and 2500 psig ($5515 \times 10^3$ and $17235 \times 10^3$ pascal gage), typically between about 800 and 1600 psig ($5515 \times 10^3$ and $11030 \times 10^3$ pascal gage). The weak weld in particular provides a supplemental venting system allowing gas to escape from within the cell should the cell be abused as above described.

Alternatively, the supplemental venting mechanism may be in the form of a grooved vent, that is, one or more grooves on the surface of casing 100 which results in an underlying thinned material region. The depth of the groove and thickness of the underlying thinned material region can be adjusted so that the thinned region ruptures when gas pressure within the cell rises to a pressure P2 greater than P1. In another embodiment the reseatable plug can be eliminated and a laser weld can be used as the primary vent mechanism activating at a pressure P1. In such embodiment the supplemental venting mechanism may be a thinned material region underlying a groove on the casing surface. The thinned material may be designed to rupture at a higher pressure level P2.

In yet another embodiment there can be a plurality of grooves on the casing surface. One groove may have underlying thinned regions of small thickness allowing it to rupture as gas within the cell builds up to the design pressure level, P1. A second groove on the casing surface, which may be contiguous with or spaced apart from the first groove, may have an underlying thinned region designed to rupture if gas pressure within the cell builds up to a higher pressure, P2.

When the casing 100 is of steel, for example, nickel plated cold rolled steel or stainless steel, a groove such as groove 600a (FIG. 8) can be formed on the casing surface so that the thinned material underlying the groove will rupture when gas pressure within the cell reaches a pressure of between about 400 and 800 psig ($2758 \times 10^3$ and $5515 \times 10^3$ pascal gage). The non grooved portions of the casing wall may typically have an average wall thickness of between about 0.3 and 0.50 mm, desirably between about 0.3 and 0.45 mm. In order to achieve rupture pressures between about 400 and 800 psig ($2758 \times 10^3$ and $5515 \times 10^3$ pascal gage), the groove is formed so that the underlying thinned material has a thickness typically of between about 0.07 and 0.08 mm. In a specific nonlimiting example, if the groove is formed so that the underlying thinned material has a thickness of about 0.074 mm, such underlying material will rupture when the gas pressure within the cell reaches a level of about 435 psig ($2999 \times 10^3$ pascal gage).

A groove 600 which may, for example, be in the form of a groove 600a or 600b (FIGS. 8-8A) on the casing surface may be made by stamping the surface of the casing with a die, preferably a die having a cutting knife edge. A mandrel is held against the inside surface of the casing as the stamping die punches into the casing outside surface. For grooves formed with such stamping or cutting die, the thickness of the underlying thinned region 610 (FIG. 9) primarily determines the pressure at which the thinned region will rupture. The groove cut may desirably be V-shaped (FIG. 9), which is obtained preferably with a stamping die having a knife edge. The V shaped groove desirably has an acute angle, α, of about 40 degrees. The groove 600 can be made by other methods, for example, by chemical etching.

Figure 8:
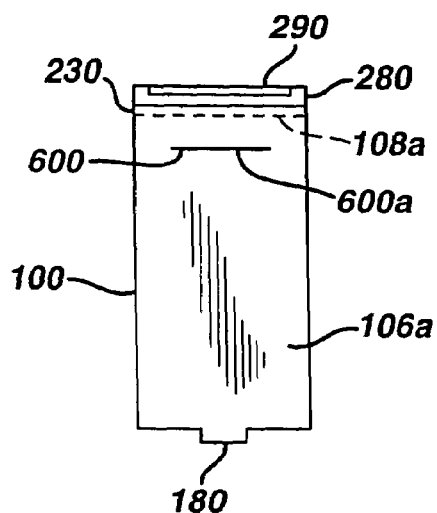
FIG. 8 is a side view of the cell showing a groove within the casing body forming an underlying region of thinned material.
Figure 8A:
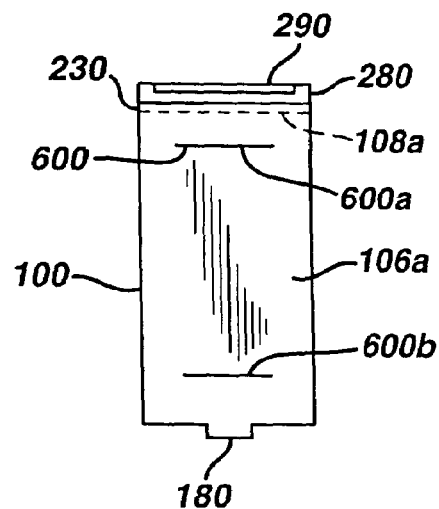
FIG. 8A is a side view of the cell showing a plurality of grooves within the casing body wherein each groove forms an underlying region of thinned material.
Figure 9:
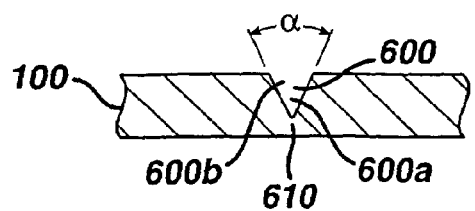
FIG. 9 is a cross sectional view of a representative groove shown in FIGS. 8 and 8A.

The thinned material underlying groove 600 is preferably the same as the casing material, typically of nickel-plated cold-rolled steel. The groove 600 may have boundaries which are straight or curved or may have a combination of straight and curved portions. The groove 600 may have boundaries which are rectangular, polygonal or oblong. The groove may have at least a portion of their boundaries which are convoluted, that is partially convex and partially concave. The groove boundary may be closed or open. In a preferred embodiment herein the groove can be a straight or substantially straight, preferably parallel to a wide edge 108a of the casing (FIG. 8-8A). For example, in a 7/5-F6 size rectangular cell, the groove 600a (FIGS. 8 and 8A) can desirably be located parallel to casing wide edge 108a and about 10 mm therefrom and may have a length of about 8 mm.

There may be a second groove 600b spaced apart from a first groove 600a as shown in FIG. 8A. In a specific non limiting embodiment the second groove 600b may be parallel to groove 600a and about 10 mm from the positive terminal 180 (closed end). Groove 600b may have a length of about 8 mm. In such case the underlying material thickness of each groove 600a and 600b may be different so that the underlying material in each ruptures when gas pressure within the cell reaches different pressure levels. For example, the thinned material underlying groove a 600a can be designed to rupture when gas pressure within the cell reaches a design burst pressure of between about 250 and 800 psig. To achieve such range in burst pressure between about 250 and 800 psig ($1724 \times 10^3$ and $5515 \times 10^3$ pascal gage), the thinned material underlying groove 600a has a thickness between about 0.04 and 0.15 mm. Alternatively, the thinned material underlying groove 600a can be designed to rupture when gas pressure within the cell reaches a design burst pressure of between about 400 and 800 psig ($2758 \times 10^3$ and $5515 \times 10^3$ pascal gage). To achieve such burst pressure between 400 and 800 psig the thinned material underlying the groove 600a has a thickness between about 0.07 and 0.15 mm. The thinned material underlying second groove 600b can be designed to rupture when gas pressure within the cell ruptures in a catastrophic situation in the event that the cell be misused and gas pressure within the cell rapidly rises to a level of between about 800 and 1600 psig ($5515 \times 10^3$ and $11030 \times 10^3$ pascal gage). In order to achieve rupture at pressure levels between about 800 and 1600 psig the thinned material 610 underlying groove 600b, typically has a thickness of between about 0.15 and 0.35 mm.

EXAMPLE 1

Weak Weld Using Nd:Yag Laser

The weak weld used to weld metal cover 230 to casing 100 along casing edge 106c (FIG. 6 or 6A) can be produced by employing an Nd:Yag laser. The laser is operated at a frequency of about 100 Hertz. The peak power output per pulse is about 35 Watts. The average power output is 0.5 Killiwatts. The pulse width (cycle time between peak power) is about 0.7 millisecond. The laser feed rate (rate of movement of the laser along weld path) is about 3 inches per minute. A uniform weld along long edge 106c of the casing is produced thereby welding abutting long edge 230a of metal cover 230 thereto. The weld had a uniform depth of penetration between about of 2 and 4 mils (0.0508 and 0.102 mm), typically about 3 mil (0.0762 mm). The weld cracks when pressure within the cell reaches a level of between about 400 and 800 psig ($2757 \times 10^3$ and $5515 \times 10^3$ pascal gage) and thereby functions as a supplemental vent should the operation of primary vent (plug 260) become compromised.

EXAMPLE 2

Strong Weld Using Nd:Yag Laser

The strong weld used to weld metal cover 230 to casing 100 along casing edges 106d, 107c and 107d (FIG. 6 or 6A) can be produced by employing an Nd:Yag laser. The strong weld used to weld metal cover 230 to casing 100 along casing edge 106d, 107c and 107d can be produced by employing an Nd:Yag laser. The laser is operated at a frequency of about 12 Hertz. The peak power output per pulse is about 46 Watts. The average power output is 0.65 Killiwatts. The pulse width (cycle time between peak power) is about 5.9 millisecond. The laser feed rate (rate of movement of the laser along weld path) is about 2 inches per minute. A uniform weld along long edges 106d, 107c, and 107d of the casing is produced thereby welding abutting edges of metal cover 230 thereto as shown in FIG. 6. The weld had a uniform depth of penetration of between about 5 and 7 mils (0.127 and 0.178 mm), typically about 6 mil 0.152 mm). The weld cracks when pressure within the cell reaches a level of between about 800 and 2500 psig ($5515 \times 10^3$ and $17235 \times 10^3$ pascal gage), typically between about 800 and 1600 psig ($5515 \times 10^3$ and $11030 \times 10^3$ pascal).

In commercial production the above described Nd:Yag laser could be operated at higher peak power of about 125 Watts to produce the weak weld and a peak power of about 150 Watts to produce the strong weld. Such operation at higher peak power allows the laser to be moved along the weld path (feed rate) at higher speed.

Figure 2A:
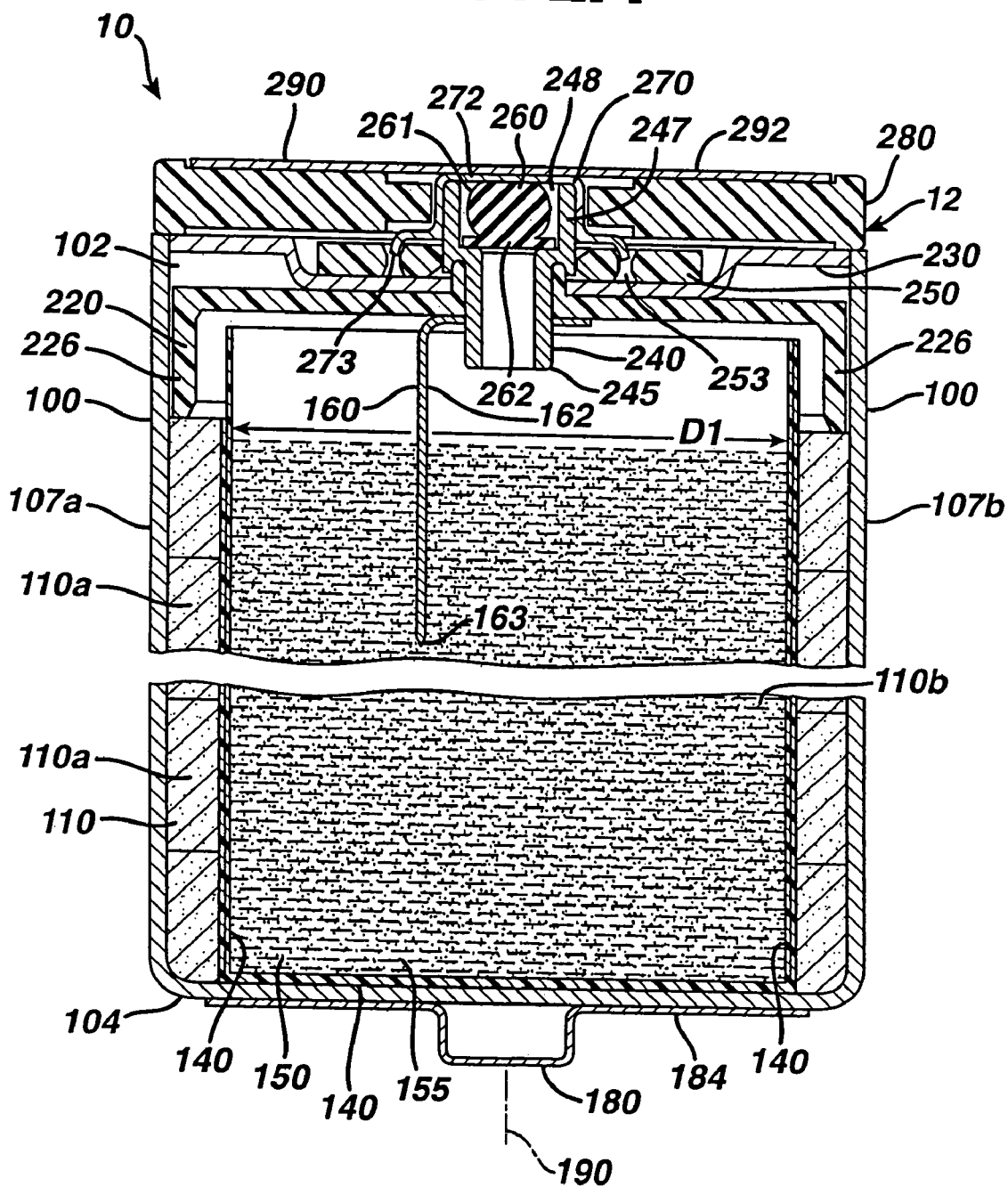
FIG. 2A is a cross sectional view of the cell shown in FIG. 1 taken along view lines 2-2 and showing a modified plug design.
Figure 3A:
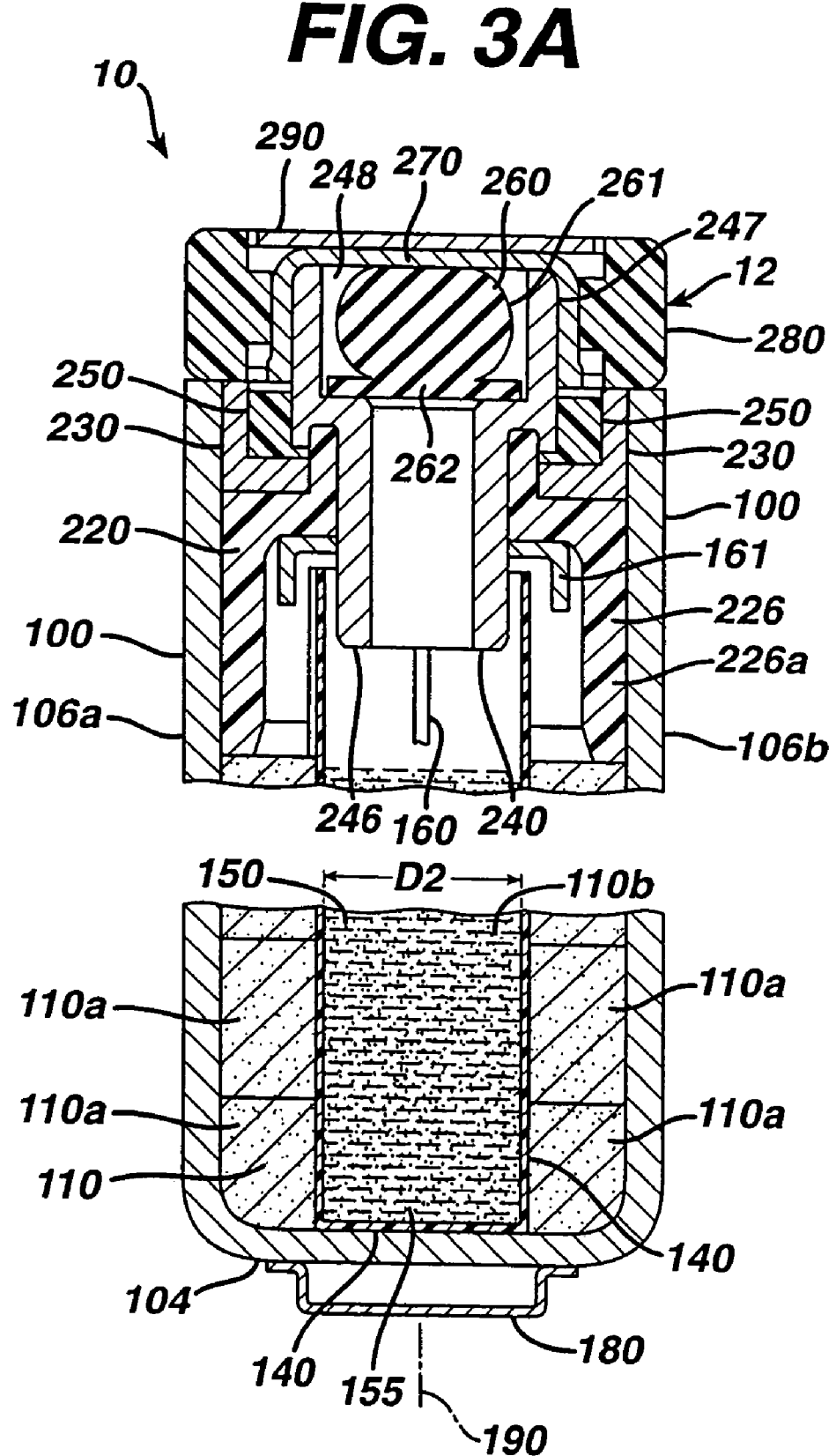
FIG. 3A is a cross sectional view of the cell shown in FIG. 1A taken along view lines 3-3 and showing a modified plug design.

Additionally in order to reduce the deleterious effect of any KOH crystalline buildup between plug 260 and the inside surface of vent cap 270, which may possibly occur if the cell is inadvertently subjected to charging, the plug 260 may be modified so that it occupies less space within the cavity in rivet head 247 housing plug 260. A specific embodiment of such improved design is shown as plug 260 in FIGS. 2A, 3A, and 4A. In the improved design of plug 260 shown in FIG. 4 the plug occupies less space within rivet head cavity 248 than the frustum design for the plug shown in FIGS. 2, 3 and 4. After the plug 260 of compressed into the rivet head cavity 248 the amount of free space within cavity 248 housing said plug is greater than about 10 percent, desirably between about 10 and 40 percent. By contrast the amount of free space within the rivet cavity of plug 260 shown in the frustum embodiment shown in FIGS. 2, 3, and 4 is typically less than about 10 percent.

It has been determined that the greater amount of free space, typically between about 10 and 40 percent within rivet head cavity 248, which is achieved with the modified plug design (FIG. 4A) assures more effective operation of the plug in an abuse situation, for example, if the cell is inadvertently subjected to charging as above described. Such modified plug 260 (FIG. 4A) desirably unseats as gas pressure within the cell reaches the design threshold level, e.g. between about 100 and 300 psig. The greater amount of free space within rivet head cavity 248 accommodates any gradual KOH crystalline buildup therein, which may occur if the cell is abused by inadvertent charging. There is nevertheless enough free space remaining within rivet head cavity 248 to allow the plug 260 to operate effectively in unseating itself to allow gas pressure to release as pressure within the cell builds up to the design threshold level.

Figure 4A:
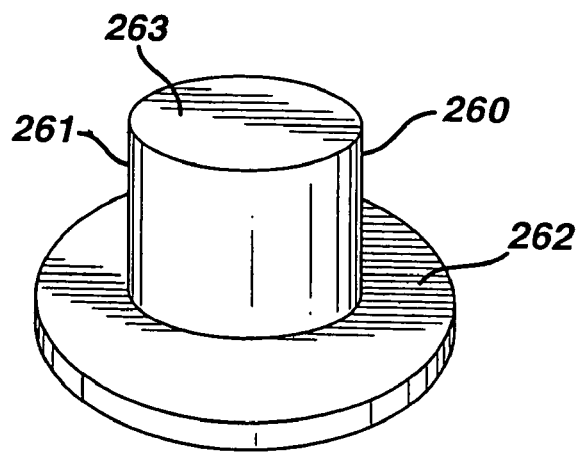
FIG. 4A is a perspective view of the modified plug shown in FIGS. 2A and 3A before it has been compressed into its casing cavity.
Figure 4B:
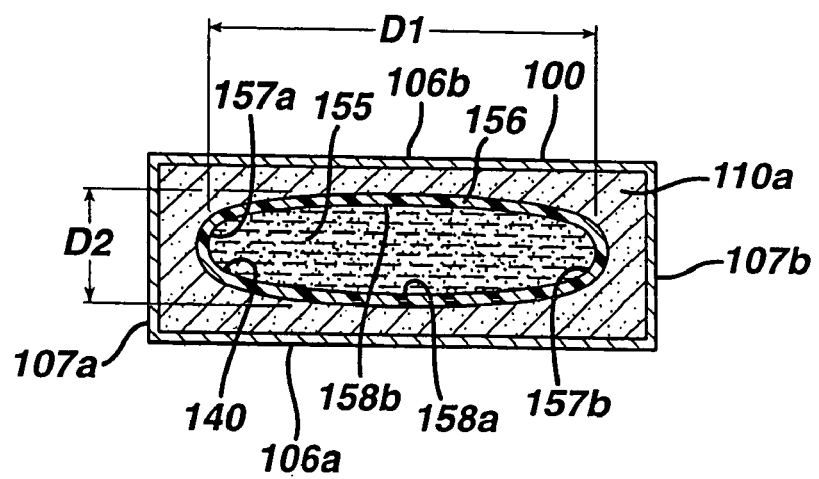
FIG. 4B is a plan view of a cross section of the cell taken in a plane perpendicular to the cell's longitudinal axis along sight lines 4B-4B of FIG. 1A to show an elongated anode cavity.
Figure 4C:
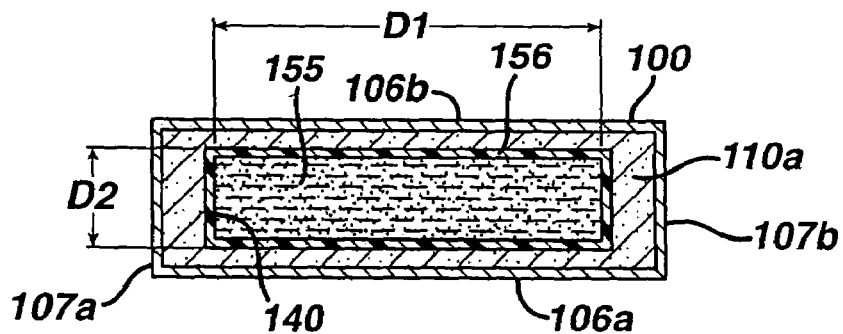
FIG. 4C is a plan view of a cross section of the cell to show another embodiment of the elongated anode cavity.
Figure 4D:
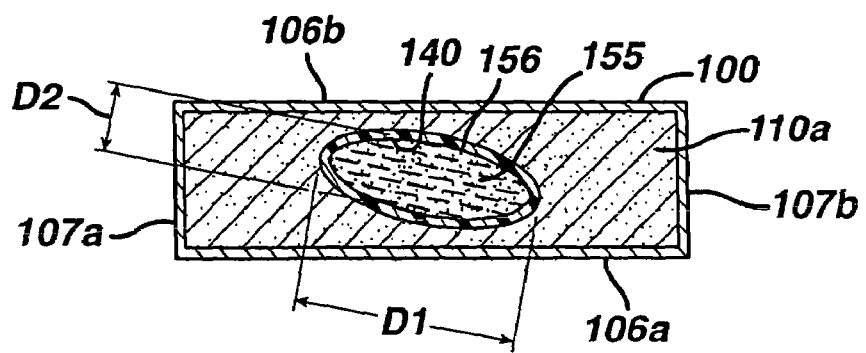
FIG. 4D is a plan view of a cross section to show a third embodiment of the elongated anode cavity.

The shape of plug 260 can be altered as shown in FIG. 4A to achieve the greater amount of free space within rivet head cavity 248. In the modified design (FIG. 4A) plug 260 has a cylindrical base 262 and integrally formed cylindrical body 261 of smaller diameter extending therefrom. The ratio of diameter of body 261 to the diameter of base 262 can be adjusted as required to achieve the desired greater amount of free space within rivet head cavity 248, typically between about 10 and 40 percent, after modified plug 260 (FIG. 4A) has been compressed within the cavity. The cylindrical shape of body 261 withstands well the pressure of compressing plug 260 within rivet head cavity 248. Modified plug 260 (FIG. 4A) is compressed within rivet head cavity 248 by applying a force to the top surface 263 of the plug and then welding vent cap 270 to the rivet head 247. This keeps plug 260 tightly seated in compressed state within rivet head cavity 248. In the compressed state the body 261 of plug 260 assumes a bulbous configuration as shown in FIGS. 1A and 2A. When gas pressure within the cell builds up to a threshold level, desirably between about 100 and 300 psig, the plug unseats itself thereby letting gas from within the cell to escape through vent apertures 272 within vent cap 270. Preferably there are at least two vent apertures 272 within vent cap 270 to assure that there will be a clear path through which gas can escape from vent cap 270 as plug 270 unseats. Plug 260 is desirably of an elastomeric, preferably rubber material which is sufficiently compressible and resilient, yet resists chemical attack or physical degradation upon contact with alkaline electrolyte. A preferred rubber material for plug 260 is vulcanized EPDM rubber, desirably having a Durometer hardness between about 80 and 85.

Although the modified configuration for plug 260 as shown in FIG. 4A is preferred, it will be appreciated that other shapes of the plug can help achieve the desired increase in free space within rivet head cavity 248 which houses the plug. For example, the body 261 of the plug could be slightly sloped instead of cylindrical as shown in FIG. 4A. Also the width of rivet head cavity can be enlarged in the direction of wide side of the cell (FIG. 2A). In such case the rivet head cavity 248 will be elongated along one axis, that is, in the direction of the wide side of the cell (FIG. 2A). However, the symmetrical (circular) rivet head cavity 248, as presently shown in the figures, is preferred.

It is not intended to restrict the invention to any particular size rectangular cell. However, by way of particular example, the alkaline cell 100 can be is a small sized rectangular (cuboid), typically having a thickness between about 5 and 10 mm, particularly a thickness between about 5 and 7 mm as measured by the outside surface of the casing in the direction of the cell thickness. The cell width may typically be between about 12 and 30 mm and the cell length may typically be between about 40 and 80 mm. In particular the alkaline cell 10 of the invention can be used as a replacement for same sized rechargeable nickel metal hydride cells, for example, standard 7/5-F6 size rectangular cells. An 7/5-F6 size cell has thickness of 6.1 mm, width of 17.3 mm, and length of about 67.3 mm.

Chemical Composition of a Representative Cell

The following description of cell composition regarding the chemical composition of anode 150, cathode 110, and separator 140 is applicable to the flat rectangular alkaline cells disclosed in the above described embodiments.

In the above described cell 10, the cathode 110 comprises nickel oxyhydroxide (NiOOH), and an anode 150 comprises zinc, an ion-permeable separator, and alkaline electrolyte. The anode material 150 can be in the form of a gelled mixture containing a mercury-free (zero-added mercury) zinc alloy powder. The anode active material can include for example, zinc-based particles admixed with conventional gelling agents, such as sodium carboxymethyl cellulose or the sodium salt of an acrylic acid copolymer, and alkaline electrolyte. The alkaline electrolyte comprises a conventional mixture of potassium hydroxide and zinc oxide dissolved in water.

The Cathode 110 Desirably has the Following Composition:

The cathode preferably can include an active cathode material comprising nickel oxyhydroxide (NiOOH), an electrically conductive additive that can include conductive carbon particles, preferably oxidation-resistant graphitic carbon particles, and alkaline electrolyte. Generally, the cathode can include, for example, between 60 and 97 wt. %, between 80 and 95 wt. %, or between 85 and 90 wt. % of the nickel oxyhydroxide. The active cathode material also can comprise an admixture of nickel oxyhydroxide and manganese dioxide (e.g., EMD) as disclosed for example in U.S. Pat. No. 6,566,009. Optionally, the cathode also can include an oxidizing additive, a polymeric binder, or combinations thereof. The oxidizing additive can be more readily reduced than the active cathode material, thereby serving as a sacrificial additive. Examples of oxidizing additives include sodium hypochlorite, sodium peroxydisulfate, potassium peroxydisulfate, barium permanganate, barium ferrate or silver oxide. The presence of an oxidizing additive can serve to stabilize the nickel oxyhydroxide thereby improving the storage characteristics of the cell.

The basic electrochemical discharge reaction at the cathode involves reduction of nickel oxyhydroxide according to the following representative reaction shown in Eq. 1. However, it will be appreciated that other secondary reactions (e.g., self-discharge) are possible as well.

$$NiOOH + H_2O + 1e^{-1} = Ni(OH)_2 + OH^- \quad \text{(Eq. 1)}$$

The nickel oxyhydroxide can include one or more nickel oxides. The nickel oxyhydroxide can be selected from beta-nickel oxyhydroxide, cobalt oxyhydroxide-coated beta-nickel oxyhydroxide, gamma-nickel oxyhydroxide, cobalt oxyhydroxide-coated gamma-nickel oxyhydroxide, a solid solution or physical mixture of beta-nickel oxyhydroxide and gamma-nickel oxyhydroxide, a solid solution or physical mixture of cobalt oxyhydroxide-coated beta-nickel oxyhydroxide and cobalt oxyhydroxide-coated gamma-nickel oxyhydroxide. The nickel oxyhydroxide can be a powder including particles that are nominally spherical, spheroidal, or ellipsoidal in shape. The average particle size of the nickel oxyhydroxide powder can be between 1 and 100 microns, 2 and 50 microns or 5 and 10 microns. The nickel oxyhydroxide also can include at least one bulk dopant. The bulk dopant can be selected from aluminum, manganese, cobalt, zinc, gallium, indium, or bismuth. The bulk dopant can be present at a relative weight percentage of less than about 10%, less than about 5% or less than about 2%. The dopant can serve to increase the conductivity of the nickel oxyhydroxide as well as to decrease the open circuit voltage (OCV) of the cell thereby decreasing oxidation of electrolyte during storage.

Cobalt oxyhydroxide can be applied to the surface of the nickel oxyhydroxide particles so as to cover at least 60% of their surface, desirably at least 70%, preferably at least 80%, more preferably at least 90% of the surface. The cobalt oxyhydroxide-coated nickel oxyhydroxide can be formed from nickel hydroxide coated with between 2% and 15%, between 3% and 10%, between 4% and 8% or between 4% and 5% cobalt hydroxide by weight. The cobalt oxyhydroxide coating can serve to enhance inter-particle electrical contact between nickel oxyhydroxide particles thereby improving bulk conductivity of the cathode. Further, the cobalt oxyhydroxide coating can serve to improve retention of capacity after storage for extended periods of time at a high temperature, for example, 60° C. Optionally, the cobalt oxyhydroxide coating can include at least one dopant selected from magnesium, calcium, strontium, barium, scandium, yttrium, lanthanum, rare earth elements, titanium, zirconium, hafnium, chromium, manganese, nickel, copper, silver, zinc, cadmium, aluminum, gallium, indium, bismuth or combinations thereof.

Suitable commercial nickel oxyhydroxide and cobalt-coated nickel oxyhydroxide can be obtained from Kansai Catalyst Co. (Osaka, Japan), Tanaka Chemical Co. (Fukui, Japan), H.C. Starck GmbH & Co. (Goslar, Germany), Umicore-Canada Inc., (Sherwood Park, Alberta, Canada) or OM Group Inc. (Westlake, Ohio).

The electrically conductive additive can be included in an admixture with nickel oxyhydroxide to enhance bulk electrical conductivity of the cathode. Examples of suitable electrically conductive additives include carbon particles, nickel powder, cobalt powder, cobalt oxide, cobalt oxyhydroxide, carbon fibers, carbon nanofibers, fullerenes or combinations thereof. Carbon nanofibers are described, for example, in commonly assigned U.S. Ser. No. 09/658,042, filed Sep. 7, 2000 and U.S. Ser. No. 09/829,709, filed Apr. 10, 2001. More particularly, the cathode can include between 2 and 20 wt. % or between 5 and 15 wt. % or between 6 and 8 wt. % of conductive carbon particles. Conductive carbon particles can include graphitized carbon, carbon black, petroleum coke or acetylene black. Preferably, the conductive carbon is a graphitized carbon. Graphitized carbon can include natural graphite, synthetic graphite, expanded graphite, graphitized carbon black, carbon nanofibers, fullerenes or mixtures thereof. Graphitized carbon particles can have a wide variety of shapes including substantially spherical, elongated or needle-like having one dimension substantially longer than the others, flake-like having two dimensions elongated relative to a third or fibrous and thread-like. Generally, both natural and synthetic graphite particles can have a flake-like shape. A mixture of graphitized carbon particles can include, for example, from about 10 to 90 percent by weight natural or synthetic graphite and from 90 to 10 percent by weight expanded graphite. However, the described mixtures are intended to be illustrative and are not intended in any way to restrict this invention.

In an alkaline cell including nickel oxyhydroxide as the active cathode material, it has been determined to be preferable to use a natural or synthetic graphite that is oxidation-resistant. Nickel oxyhydroxide has an oxidation potential sufficiently high so as to promote oxidation of alkaline electrolytes during storage of the cell and can result in the evolution of oxygen gas according to Eq. 2.

$$2NiOOH + H_2O \rightarrow 2Ni(OH)_2 + \tfrac{1}{2}O_2 \quad \text{(Eq. 2)}$$

Oxidation of electrolyte by nickel oxyhydroxide is a well-known self-discharge process for aqueous nickel electrodes that can decrease discharge capacity of the cathode. The evolved oxygen gas also can promote oxidation of the graphite in the cathode. Oxidation of graphite can decrease bulk conductivity of the cathode as well as form carbon dioxide gas according to Eq. 3. The carbon dioxide gas can react further with the electrolyte to form a potassium carbonate solution as shown in Eq. 4.

$$C + O_2 \rightarrow CO_2 \quad \text{(Eq. 3)}$$

$$CO_2 + 2KOH \rightarrow K_2CO_3 + H_2O \quad \text{(Eq. 4)}$$

An increase in the concentration of carbonate ion in the electrolyte can decrease ionic conductivity as well as increase polarization of the zinc anode, thereby decreasing overall cell performance. The evolved oxygen also can oxidize graphite in the conductive coating applied to the inner surface of cell casing, thereby increasing contact resistance between the cathode and the cathode current collector. Further, during storage of cells at elevated temperatures for extended periods of time, the nickel oxyhydroxide can oxidize graphite in both the cathode and the conductive coating directly. In addition to oxidizing graphite in the cathode, the evolved oxygen also can diffuse into the anode and react with the zinc-based particles of the anode to form zinc oxide, thereby decreasing capacity of the anode. It has been determined as part of the present invention herein, that the use of an oxidation-resistant graphite as a conductive additive in cells also including nickel oxyhydroxide can greatly reduce the undesirable self-discharge processes described hereinabove, thereby minimizing loss of cell capacity, especially after storage at elevated temperatures. Desirably, the graphite included in a cathode including nickel oxyhydroxide can include, for example, from 10 wt. % to 90 wt. %, preferably 100 wt. % of an oxidation-resistant graphite based on the total graphite.

In general, the oxidation-resistance of a graphite is determined by many contributing factors. For example, it is believed that the rate of graphite oxidation is at least partially related to the specific surface area of the graphite particles whereby, the smaller the surface area, the more oxidation-resistant the graphite. Similarly, oxidation resistance of a graphite can be at least partially related to the average particle size as well as the particle size distribution. Because larger size particles typically can have lower surface areas, they can be expected to be more resistant to oxidation. Thus, a graphite having a particle size distribution with a large percentage of small particles will be less oxidation-resistant than one with a smaller percentage of small particles. However, the average particle size still must be sufficiently small to form an effective conductive network inside the cathode, whereby the graphite particles can be in intimate contact with both nickel oxyhydroxide particles and other graphite particles. Thus, an oxidation-resistant graphite can have an average particle size desirably between about 3 and 30 microns, preferably between about 5 and 20 microns. Also, oxidation resistance is believed to be at least partially related to the average crystallite size of the graphite particles as determined by x-ray diffraction, whereby the larger the average crystallite size, the more oxidation-resistant the graphite. An average crystallite size along the a-axis direction of the crystallographic unit cell, $L_a$, of greater than about 2000 angstroms and along the c-axis direction, $L_c$, of greater than about 1500 angstroms is desirable. Further, it is believed that oxidation resistance also can depend, at least partially, on the relative number of surface defects or dislocations present in the graphite particles. The relative number of defects can be represented by the ratio of the integrated area underlying the "D" absorption band centered between 1330 and 1360 cm$^{-1}$ to the integrated area underlying the "G" absorption band centered between 1570 and 1580 cm$^{-1}$ in the first order laser Raman absorption spectrum. Typically, small size graphite particles have higher defect levels than larger particles of the same graphite. Desirably, an oxidation-resistant graphite can have relatively low levels of defects, for example, corresponding to a defect ratio less than 0.15.

Typically, an oxidation-resistant graphite can be prepared by treating a high purity natural or synthetic graphite in a non-oxidizing atmosphere at very high temperatures, for example, greater than about 2500° C. or about 3000° C. Treating a high purity synthetic graphite at a high graphitization temperature for an extended period of time can produce graphite having a higher degree of crystallinity, a larger average crystallite size, fewer surface defects, lower specific surface area, and higher chemical purity (i.e., lower ash content) than the starting graphite. An oxidation-resistant graphite with a maximum ash content of less than about 0.1 wt. % is desirable and less than about 0.05 wt. %, more desirable.

Suitable oxidation-resistant synthetic graphites are available commercially under the trade designation "TIMREX® SFG" from Timcal America Co. (Westlake, Ohio). SFG-type graphites suitable for use in an admixture with nickel oxyhydroxide in the cathode of the cell of the invention include SFG44, SFG15, SFG10, and SFG6. Preferred oxidation-resistant synthetic graphites include TIMREX SFG10 and SFG15. (The number appearing after the SFG designation refers to the $d_{90}$ particle size which is defined as follows: 90 volume percent of the particles in a distribution plot of particle size versus volume percent have a particle size in microns less than the indicated number as determined by the laser diffraction method. For example, SFG10 graphite has a $d_{90}$ particle size of about 10 microns. It should be noted that the mean average particle size typically is much smaller, for example, 7 microns for SFG10.) Other suitable synthetic oxidation-resistant graphites are available from Timcal under the trade designation TIMREX® SLP50 and SLX50.

A suitable oxidation-resistant, heat-treated natural graphite is available, for example, under the trade designation 2939 APH-M from Superior Graphite Co.(Chicago, Ill.). The properties and performance in cells of this oxidation-resistant purified natural graphite appear to be comparable to those of the above referenced oxidation-resistant synthetic graphites.

An oxidation-resistant synthetic graphite also can be dispersed in an organic solvent or water including a film-forming binder, and a surfactant or dispersing aid and applied in a continuous layer to the inside surface of the cell casing. After drying, the coated layer is conductive and can improve electrical contact between the cathode and the cell casing that serves as the cathode current collector. Such an oxidation-resistant coating also serves to maintain good conductivity between a cathode containing nickel oxyhydroxide and the cell casing, especially after storage at elevated temperatures or at ambient temperature for long periods of time.

An alkaline cell with a cathode comprising nickel oxyhydroxide characteristically has a flat discharge voltage profile that maintains the closed circuit voltage during discharge better than conventional alkaline cells with a cathode comprising manganese dioxide, particularly at high drain rates. Nickel oxyhydroxide also can be included in an admixture with manganese dioxide to increase the average closed circuit voltage of a conventional alkaline cell.

The Anode 150 has the Following Composition:

Anode 150 can include between about 60 and 80 wt. %, between 62 and 75 wt. %, preferably between about 62 and 72 wt. % of zinc-based particles. Preferably, the zinc-based particles include zinc alloy particles comprising 99.9 wt % zinc containing 200 to 500 ppm indium as alloy and plated material. The term "zinc" as used herein shall be understood to include zinc alloy which can comprise a very high concentration of zinc, for example, at least 99.9 percent by weight zinc. Such a zinc alloy can function electrochemically essentially as pure zinc. The zinc-based particles can have a mean average particle size between about 1 and 350 microns, between about 1 and 250 micron, and preferably between about 20 and 250 micron. The zinc-based particles can be predominantly acicular, flake-like or spherical in shape. The bulk density of zinc-based particles is typically between about 1.75 and 2.2 grams zinc per cubic centimeter of anode.

In general, anode 150 also can include an alkaline electrolyte, a gelling agent, and a surfactant. The percentage of electrolyte in the anode is preferably between about 69.2 and 75.5% by volume of the anode. The electrolyte can be an aqueous solution of an alkali metal hydroxide, such as potassium hydroxide, sodium hydroxide, lithium hydroxide or mixtures thereof. The electrolyte can contain between 15 and 60 wt. %, between 20 and 55 wt. % or between 30 and 50 wt. %, for example, 38 wt. % of the alkali metal hydroxide. The electrolyte can contain from 0 to 6 wt. % of a dissolved metal oxide, for example, about 2 wt. % zinc oxide. Suitable gelling agents can include a cross-linked polyacrylic acid, a hydrolyzed polyacrylonitrile grafted onto a starch backbone, a polyacrylic acid salt, a carboxy-methylcellulose, a carboxymethylcellulose salt (e.g., sodium carboxymethylcellulose) or combinations thereof. Examples of a polyacrylic acid include CARBOPOL 940 and 934 (available from B.F. Goodrich) and POLYGEL 4P (available from 3V) and a grafted starch material include WATERLOCK A221 and A220 (available from Grain Processing Corp.). An example of a polyacrylic acid salt includes ALCOSORB G1 (available from Ciba Specialties). The anode can include, for example, between 0.05 and 2 wt. % or between 0.1 and 1 wt. % of one or more gelling agents. Other representative gelling agents for zinc anodes are disclosed in U.S. Pat. No. 4,563,404. Suitable surfactants include an organic phosphate ester-based surfactant available under the tradename GAFAC RA600 (available from Rhône-Poulenc) and a dionyl phenol phosphate ester-based surfactant available under the tradename RM-510 (available from Rhône-Poulenc). The surfactant can be added to the anode at a level of between 100 and 1000 ppm by weight. Such anode compositions are given only as illustrative examples and are not intended to restrict the present invention.

The zinc anode half-cell reactions on cell discharge are given by Eq. 5 and Eq. 6:

$$Zn \rightarrow Zn^{+2} + 2e^- \quad \text{(Eq. 5)}$$

$$Zn^{+2} + 2OH^- \rightarrow ZnO + H_2O \quad \text{(Eq. 6)}$$

Anode 150 preferably comprises zinc fines that can be included in an admixture with other zinc-based particles having larger average particle size. One convenient way to describe the relative amount of zinc fines in the total zinc-based particles is the percentage by weight of the zinc-based particles that can pass through a 200 mesh size screen (sieve). Thus, as used herein, "zinc fines" are zinc-based particles small enough to pass through a 200 mesh screen. The referenced mesh size is a Tyler standard mesh size commonly used in the industry and corresponds to a U.S. standard sieve having a 0.075 mm square opening. (Tables to convert specific Tyler mesh sizes to square openings in millimeters are available, for example, in U.S. Standard Screen Specification ASTME-11.) Table 1 is an abbreviated conversion table.

TABLE 1

| Sieve-Square Opening, mm | Tyler Standard |
|---|---|
| 0.850 | 20 mesh |
| 0.250 | 60 mesh |

TABLE 1-continued

| Sieve-Square Opening, mm | Tyler Standard |
|---|---|
| 0.150 | 100 mesh |
| 0.106 | 150 mesh |
| 0.075 | 200 mesh |
| 0.063 | 250 mesh |
| 0.045 | 325 mesh |
| 0.038 | 400 mesh |

The anode desirably can include at least 10 wt. %, at least 30 wt. %, at least 50 wt. % or at least 80 wt %, typically between 35 and 75 wt. % of the total zinc-based particles small enough to pass through a 200 mesh size screen. For example, −200 mesh size zinc fines can have a mean average particle size between about 1 and 75 microns, for example, about 75 microns.

Even relatively small amounts of zinc fines, for example, about 1 wt. %, or about 5 wt. % of the total zinc-based particles small enough to pass through a 200 mesh size screen, can produce a beneficial effect on overall cell performance. At least 25 wt. %, for example, at least 50 wt. % of the zinc-based particles can be of a larger size (e.g., −20/+200 mesh) such that they can pass through a screen between about 20 and 200 mesh size (i.e., a screen having square openings between about 0.850 mm and 0.075 mm). For example, when the zinc-based particles in the anode include about 10 wt. % zinc fines of −200 mesh size in an admixture with 90 wt. % of larger size zinc-based particles of between −20 and +200 mesh size, the mean average particle size of the total zinc-based particles can be, for example, about 340 microns. When the zinc-based particles in the anode include 50 wt. % zinc fines of −200 mesh size in an admixture with 50 wt. % of larger size zinc-based particles of between −20 and +200 mesh size, the mean average particle size of the total zinc-based particles can be, for example, about 200 microns. When 100 wt. % of the zinc-based particles in the anode are zinc fines of −200 mesh size, the mean average particle size of the total zinc-based particles can be, for example, about 75 microns.

It will be appreciated that although the zinc fines preferably can form a portion of the total zinc-based particles in the anode, this is not intended to exclude the possibility that a portion of the total zinc-based particles also can be present in the form of agglomerated zinc-based particles with or without zinc fines present. Agglomerated zinc-based particles are disclosed in commonly assigned U.S. Pat. No. 6,300,011.

In another embodiment, at least about 10 wt. %, about 45 wt. % or about 80 wt. % of the total zinc-based particles can pass through a 325 mesh size screen (i.e., 325 mesh corresponds to a screen square opening of about 0.045 mm). The mean average particle size of zinc-based particles capable of passing through a 325 mesh size screen can typically be between about 1 and 35 microns, for example, between about 5 and 35 microns or between about 5 and 25 microns.

Even relatively small amounts, for example, about 5 wt. % or about 1 wt. % of zinc-based particles that are small enough to pass through a 325 mesh screen, can produce a beneficial effect on overall cell performance. At least 25 wt. %, for example, at least 50 wt. % of the zinc-based particles can be of larger size (e.g., −20/+325) such that they can pass through a screen between about −20 and +325 mesh size (i.e., a screen having square openings between about 0.850 mm and 0.045 mm). For example, when the total zinc-based particles in the anode include about 10 wt. % zinc fines of −325 mesh size in an admixture with about 90 wt. % of larger size zinc-based particles of between −20 and +325 mesh size, the mean average particle size of the total zinc-based particles can be about 314 microns. When the total zinc-based particles in the anode include 50 wt. % zinc fines of −325 mesh size in an admixture with 50 wt. % of larger size zinc-based particles of between −20 and +325 mesh size, the mean average particle size of the total zinc-based particles can be, for example, about 125 microns. When the total zinc-based particles in the anode include 70 wt. % zinc fines of −325 mesh size in an admixture with 30 wt. % of larger size zinc-based particles of between −20 and +325 mesh size, the mean average particle size of the total zinc-based particles can be, for example, about 50 microns. When 100 wt. % of the zinc-based particles in the anode are zinc fines of −325 mesh size, the mean average particle size of the total zinc-based particles can be, for example, about 35 microns.

Particle size as reported herein shall be construed as determined by the more common method employed in the art, namely, by laser diffraction using the Fraunhofer algorithm for computing the volume distribution of the particle sizes and the corresponding value for mean average. The laser diffraction method is described, for example, by M. Puckhaber and S. Rothele, in "Laser Diffraction—Millennium Link for Particle Size Analysis" (Powder Handling and Processing, Vol. 11, No. 1, Jauary/March 1999). The method determines particle size in terms of a mapped spherical equivalent. For example, in the extreme case of an acicular shaped particle, the mapped spherical equivalent can be visualized as the sphere revolution resulting from rotation of the particle about its central axis (i.e., the short axis perpendicular to its long axis). The term "average particle size" as used herein and in the claims, unless otherwise specified, shall be understood to be the mean average value based on a plot of distribution of particle size versus cumulative volume percent.

Another, somewhat less accurate, traditional method can be used to determine the average particle size and size distribution, namely, the sieve method. In this method, the particle size distribution can be obtained by causing the total mixture of particles to pass through a series of sieves stacked such that the sieve having the largest square openings (i.e., smallest mesh size) is positioned at the top of the stack and sieves having progressively smaller square openings (i.e., larger mesh sizes) are stacked sequentially toward the bottom of the stack. From a graphical plot of particle size, y, versus cumulative volume percent, x, of the relative volumes of particles retained between the sieves, the mean average particle size can be calculated as the integral of y dx/100, equal to the area under the plot divided by the base of 100 volume percent. However, because of better accuracy and wider usage, the mean average particle size reported herein is that determined using the laser diffraction method.

Preferably, zinc-based particles included in the anode of the flat zinc/NiOOH alkaline cell of the invention can be acicular in shape, defined herein as having a length along a major axis at least two times a length along a minor axis. The zinc-based particles also can be generally flake-like in shape, defined herein as having a flake thickness of no more than about 20% of the maximum linear dimension of the particle. Inclusion of zinc fines in the anode of the flat zinc/NiOOH alkaline cell of the invention has been determined by the applicants to improve cell performance at both high and low drain rates.

Anode 150 typically can have a total mercury content less than about 100 parts of mercury per million parts (ppm) of zinc by weight, preferably less than 50 parts of mercury per million parts of zinc by weight. The anode preferably does not contain any added amounts of lead and thus, is essentially lead-free, that is, total lead content is less than 30 ppm, desirably less than 15 ppm of the total zinc in the anode.

In general, because the level of gassing in the zinc/NiOOH cell of the invention is substantially less than that in a zinc/$MnO_2$ cell having the same size and configuration, cell 10 can be balanced in a conventional manner such that the ratio of the theoretical capacity (in mAmp-hr) of nickel oxyhydroxide (based on 292 mAmp-hr per gram NiOOH) divided by the theoretical capacity (in mAmp-hr) of zinc (based on 820 mAmp-hr per gram zinc) is about 1, for example, 0.98. In addition, the zinc/NiOOH cell of the invention can be balanced such that either NiOOH or zinc can be in slight excess, for example, the ratio of the theoretical capacity (in mAmp-hr) of nickel oxyhydroxide divided by the theoretical capacity (in mAmp-hr) of zinc can be between about 0.95 and about 1.05.

Separator 140 can be a conventional ion-permeable separator consisting of an inner layer of a nonwoven material of cellulosic and polyvinylalcohol fibers and an outer layer of cellophane. The non-woven material can contain from 78 wt. % to 82 wt. % polyvinyl alcohol and from 18 wt. % to 22 wt. % cellulosic rayon. Such a material is only illustrative and is not intended to restrict this invention.

It has been determined to be desirable to have a wall thickness of casing 100 of between about 0.30 and 0.50 mm, typically between about 0.30 and 0.45 mm, preferably between about 0.30 and 0.40 mm, more desirably between about 0.35 and 0.40. Cell 10 is preferably of cuboid shape (FIGS. 1 and 2) having an overall thickness desirably between about 5 and 10 mm.

Casing 100, is preferably of nickel-plated steel. Casing 100 is desirably coated on the inside surface with a conductive carbon coating, desirably a graphitic carbon coating. The graphitic carbon coating preferably comprises an oxidation-resistant graphite. Such graphitic carbon coatings can be formed from, for example, an aqueous-based graphite dispersion, that can be applied to at least 60%, preferably from about 75 to 90% of the inner surface of the casing and subsequently dried under ambient conditions. The graphitic carbon coating can serve to maintain good electrical contact between cathode 110 and casing 100 and also indirectly reduce the level of gassing by reducing surface corrosion on the inner surface of the casing. The metallic cover 230, negative terminal plate 290 and positive terminal plates 180 are also preferably of nickel-plated steel. Current collector 160 can be formed from a variety of known electrically conductive metals determined to be useful as current collector materials, for example, brass, tin-plated brass, bronze, copper or indium-plated brass. Insulating sealing member 220 is preferably of nylon 66 or nylon 612.

Another preferred embodiment of the invention is shown in FIGS. 10-17. Although a reusable or reactivatable vent mechanism such as reseatable plug 260 is desirable, it can be eliminated as in the embodiment shown in FIGS. 10-17. It was already indicated hereinabove that reseatable plug 260 can be eliminated and a weak laser weld can be used as a primary vent mechanism which cracks or ruptures at the activation pressure of the reseatable plug, namely a pressure P1 preferably between about 100 to 300 psig ($689 \times 10^3$ and $2068 \times 10^3$ pascal). In such case (i.e., with the reseatable plug eliminated), it was stated hereinabove that the supplemental venting mechanism may consist of a thinned material region underlying a groove (groove 600a or 600b) on the casing surface. The thinned material may be designed to rupture at a higher pressure level, P2.

As shown in the embodiment of FIGS. 10-17, it has been determined that one or more groove vents, preferably a single groove vent 600a or 600b can be used as the primary venting mechanism. In such case the single groove vent such as 600a or 600b can be cut or scored into the casing surface so that the underlying thinned region ruptures at pressure P1. Preferably, the single groove vent 600b is located in proximity to the closed end of the casing in proximity to positive terminal 180 as shown in FIG. 10A. The groove boundary may be closed or open. In a preferred embodiment herein the groove can be a straight or substantially straight, preferably parallel to a wide edge 108a of the casing (FIG. 8-8A). For example, in a 7/5-F6 size rectangular cell, there may be a groove vent 600b located on the casing wide face 106a (FIG. 10A). In a preferred embodiment groove vent 600b comprises the only groove vent on the casing surface. By way of nonlimiting example, groove 600b may be a straight groove parallel to the closed end of the cell (FIG. 10A) Preferably the ends of straight groove 600b may be equidistant from the narrow sides of the casing. In such preferred embodiment groove 600b may be about 8 mm in length and about 5 to 10 mm from the closed end 104 of the casing as shown in FIG. 10A. Although the straight groove 600b is desirable, it is not intended to limit such groove to such configuration. It will be appreciated that the groove vent 600b may have other configurations, such as curvilinear shape or partially straight and partially curvilinear and may form an open or closed boundary pattern.

The thinned material underlying groove 600b (FIG. 10A) can be designed to rupture when gas pressure within the cell reaches a design burst pressure of between about 250 and 800 psig ($1724 \times 10^3$ and $5515 \times 10^3$ pascal gage). To achieve such range in burst pressure between about 250 and 800 psig ($1724 \times 10^3$ and $5515 \times 10^3$ pascal gage), the thinned material underlying groove 600b has a thickness between about 0.04 and 0.15 mm. Alternatively, the thinned material underlying groove 600b can be designed to rupture when gas pressure within the cell reaches a design burst pressure of between about 400 and 800 psig ($2758 \times 10^3$ and $5515 \times 10^3$ pascal gage). To achieve such burst pressure between 400 and 800 psig ($2758 \times 10^3$ and $5515 \times 10^3$ pascal gage) the thinned material underlying the groove 600b has a thickness between about 0.07 and 0.15 mm. The width of groove 600b (FIG. 10A) at its base (adjacent thinned area 610) may typically be between about 0.1 and 1 mm, more typically between about 0.1 and 0.5 mm. Within such range the rupture pressure is controlled primarily by the thickness of the underlying thinned region. However, it will be appreciated that wider grooved or cut areas with underlying thinned regions on casing 100 are also possible.

Figure 15:
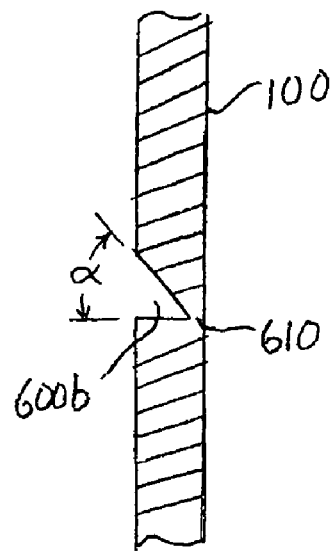
FIG. 15 shows an alternative type of V shaped groove cut from the grooved vent.

Groove 600b may be made by stamping the surface of casing 100 with a die, preferably a die having a cutting knife edge. A mandrel is held against the inside surface of the casing as the stamping die punches into the casing outside surface. Groove 600b can be cut in a V shape having equal length sides shown in FIG. 9 or in the V shape having unequal length sides as shown in FIG. 15. In the former case (FIG. 9) the sides forming the V shaped groove desirably has an acute angle, α, of about 40 degrees and in the latter case (FIG. 15) it has an angle preferably between about 10 to 30 degrees. In conjunction with groove 600b there may be one or more laser welds securing metal cover 230 to casing 100. Such welds may be comprise one or both a weak laser weld and a strong laser weld which may be designed to rupture at pressures higher than the rupture pressure of the thinned region underlying groove 600b. As earlier described such laser welds may be made using an Nd:Yag laser. The placement of contiguous weak and strong laser welds, for example, weld 310a and 310b, used to secure metal cover 230 to casing 100 have been shown and described with reference to FIGS. 6 and 6A. In a preferred embodiment there may be just one laser weld, namely, a strong weld 310b securing the entire circumferential edge of metal cover 230 to casing 100 as shown in FIG. 10. The strong weld 310 may be designed to rupture under catastrophic conditions for example, if the cell were inadvertently subjected to recharging under extremely high current or under extremely abusive conditions causing gas generation within the cell to rise abruptly to levels between about 800 psig and 2500 psig ($5515 \times 10^3$ and $17235 \times 10^3$ pascal gage).

Figure 13:
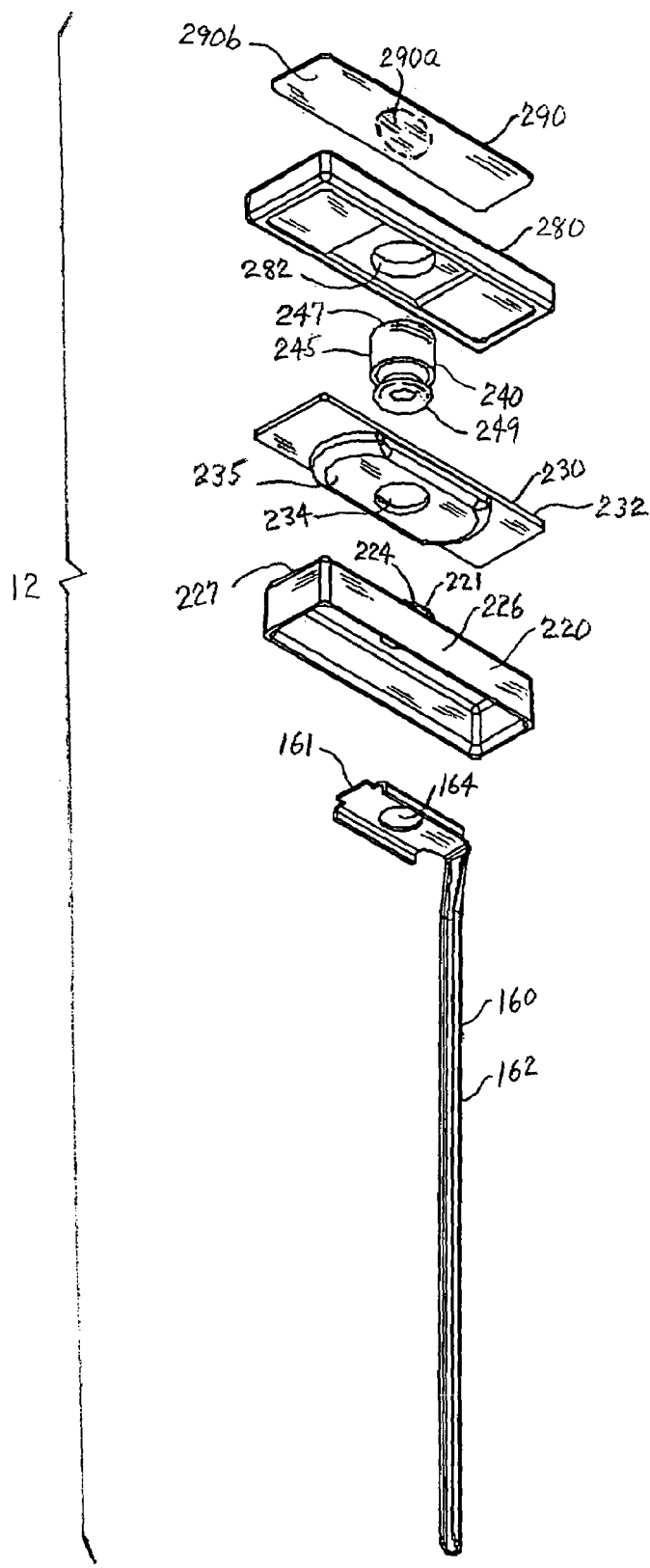
FIG. 13 is an exploded view of the components comprising the end cap assembly for the flat cell shown in FIG. 10A.

Thus, in a revised preferred cell embodiment shown in FIGS. 10 and 13, the single groove 600b functions as the cell's primary venting mechanism wherein the thinned material 610 (FIGS. 9 and 15) underlying groove 600b is designed to rupture if gas within the cell rises to a level between about 250 and 800 psig ($1724 \times 10^3$ and $5515 \times 10^3$ pascal gage), more typically between about 400 and 800 psig ($2758 \times 10^3$ and $5515 \times 10^3$ pascal gage). And the strong laser weld 310b securing the edges of metal cover 230 to casing 100 (FIG. 10) is designed to function as the cell's supplemental venting system. Such strong laser weld 310b is designed to crack or rupture in the event of a catastrophic situation when gas pressure within the cell rises abruptly to levels between about 800 psig and 2500 psig. The rupture of laser weld 310b under such catastrophic situations will allow gas to escape therethrough quickly reducing gas pressure within the cell to nominal levels.

Figure 12:
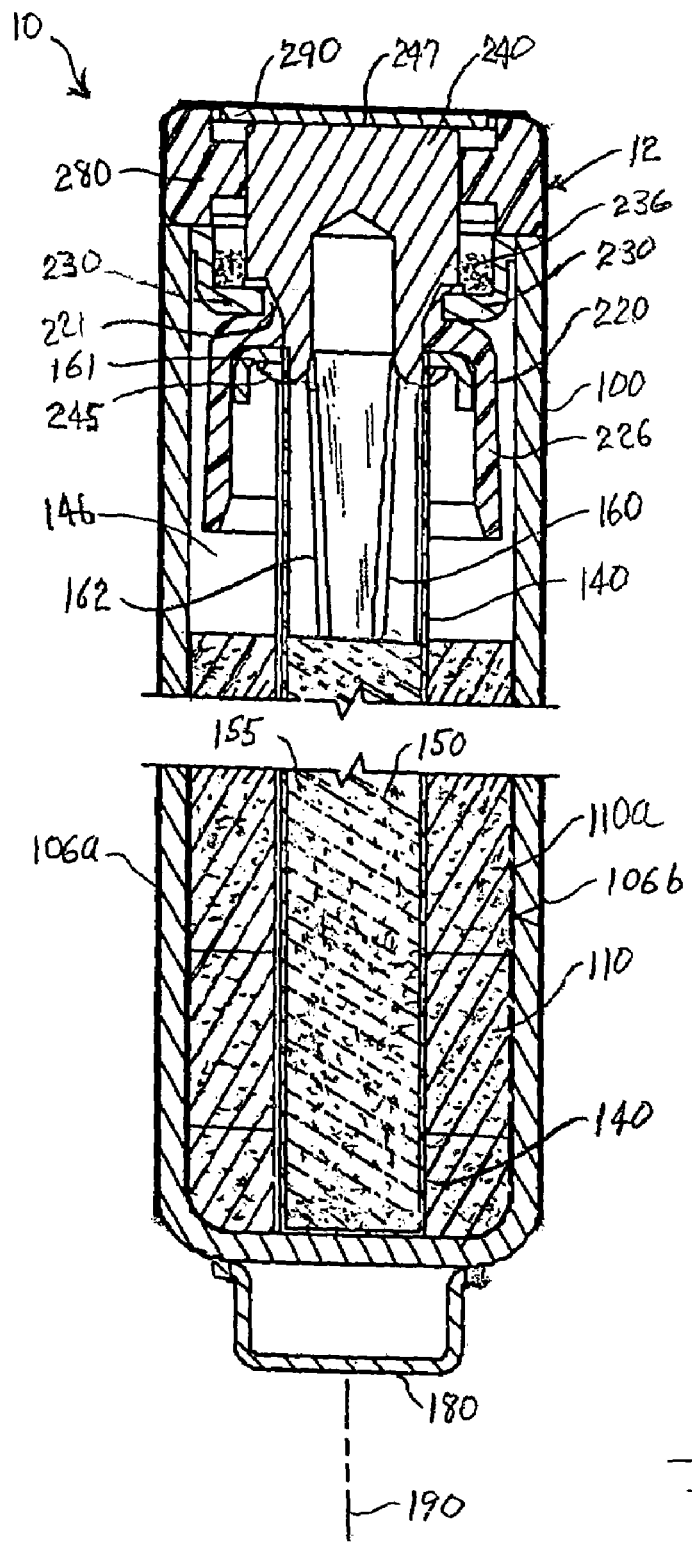
FIG. 12 is cross sectional view along the short side of the cell shown in FIG. 10A.

The cell shown in FIGS. 10 and 10A is shown in the cross section view of FIG. 11 taken through a plane parallel to large side 106a and in cross section view of FIG. 12 taken through a plane parallel to narrow side 107a. As shown in FIGS. 11 and 12 the reseatable plug 260 incorporated the previous specific embodiment (FIG. 2 and FIG. 4) has been eliminated. It was also possible to eliminate related components forming the cell's end cap assembly 12, namely, the elimination of vent pip cap 270 and plastic spacer disk 250 shown in earlier embodiments (FIGS. 2 and 4). The reduction in number of number components forming the end cap assembly 12 is also reflected in FIG. 13 which is an exploded view of the cell's internal components. Thus, in the revised embodiment (FIGS. 10-13) rivet 240 can be welded directly to the negative terminal plate 290 as shown best in FIGS. 11 and 12.

Welding of the rivet 240 to the negative terminal plate 290 can be efficiently performed by electrical resistance welding. Rivet 240 is preferably of brass, desirably brass plated with a layer of tin typically between about 1 to 3 micron thick. The negative terminal plate 290 is preferably of nickel plated cold rolled steel. It has been determined that the welding can be most efficiently performed and a uniform weld readily achieved when the thickness of the terminal plate 290 at the weld site is about 4 mil (0.102 mm). It is desirable that the remaining portion of terminal plate 290 be thicker, preferably about 8 mil (0.204 mm) for overall strength. Since 8 mil thick cold roll steel plate is commercially available, it was determined that the central portion 290a (FIG. 13) of terminal plate 290, that is, the weld area can be readily be stamped with a mandrel to reduce its thickness of the plate at the weld site to about 4 mil (0.102 mm). The stamping is preferably done from the top side of terminal plate 290 (FIG. 13) to form stamped area 290a. Such procedure will leave the thickness of the remaining portion 290b (FIG. 13) of terminal plate 290 at its original 8 mil (0.204 mm) thickness.

The central portion 290a (FIG. 13) of terminal plate 290 can be stamped in various configurations, for example, rectangular, circular or oval. In the case of a rectangular or oval stamped area 290a the long dimension of the stamped area 290a (in the direction of wide side of the casing) should be somewhat greater than the rivet head 247 diameter to allow for placement of the welding electrodes (not shown). For example, with a 3 mm diameter rivet head 247, the long dimension of the stamped area 209a may be about 4 mm and the short dimension of the stamped area 290a may be between about 3 to 4 mm. If the stamped area is circular, its diameter may be between about 3 to 4 mm, if the rivet head 247 diameter is about 3 mm.

In assembling the flat alkaline cell 10 of revised embodiment (FIGS. 10-13), anode material 150 comprising zinc fines and cathode material comprising nickel oxyhydroxide with separator 140 therebetween is inserted into cell casing 100 through open end 102. End cap assembly 12 (FIG. 13) is formed by inserting metal cover 230 over insulating seal member 220 so that the protruding head 221 of the seal member is inserted into aperture 234 of the metal cover 230. The rivet shaft 240 is then inserted through aperture 234 in metal cover plate 230 (FIG. 13). The rivet shaft 240 is insulated from metal cover 230 by protruding head 221 of the insulating seal member 220. The top flange portion 161 of anode current collector 160, preferably of brass, is pushed up against the bottom surface of sealing member 220 and fastened to the lower portion of rivet 240, preferably of brass or tin-plated brass by conventional riveting technique, thus electrically connecting current collector 160 to rivet 240. There is an aperture 164 in current collector flange 161 and also an opening 249a in the lower portion of rivet 240 to make it easier to fasten anode current collector 160 to rivet 240. (The upper portion 249b of rivet 240 is desirably solid as shown in FIGS. 11 and 12.) Upon fastening the current collector 160 to rivet 240 sealing member 220 becomes wedged between current collector flange 161 and the bottom surface of metal cover 230.

As shown best in FIGS. 10 and 11, metal cover 230 is welded by a strong laser weld (rupture pressure preferably 800 to 2500 psig) to the inside surface of casing 100. The central portion of metal cover 230 is indented or depressed forming well region 235 (FIG. 11). A sealing material 236, preferably an asphalt sealant available under the trade designation KORITE asphalt sealant (Customer Products) is applied to the depressed well region 235 on the surface of metal cover 230 (FIGS. 11 and 13). KORITE asphalt sealant is a non-hardening asphalt comprising a mixture of about 55 to 70 wt. % asphalt and 30 to 45% asphalt. The viscosity of the sealant can be adjusted by adjusting the asphalt/solvent ratio and temperature of the sealant as it is being applied. Preferably, the well region 235 within cover plate 230 and rivet head 247 are heated before the asphalt sealant is poured into the well region 235. Desirably, the asphalt sealant is at a viscosity of about 1000 centipoise as it is being poured into well region 235. The asphalt fills depressed region 235 and provides additional sealing protection between rivet 240 and sealing member 220. The subassembly comprising metal cover 230 rivet 240 and insulating seal member 220 is then inserted into the open end 102 of the casing so that the current collector shaft 162 penetrates into the anode material 150 (FIGS. 11 and 12). After the circumferential edge of metal cover 230 is laser welded to casing 100, a plastic extender seal 280 (FIG. 13) can be inserted over rivet 240. This is done by inserting rivet head 247 through aperture 282 of the plastic extender 280. A flat negative metal plate 290 is then placed onto the top surface of plastic extender 280 so that it contacts the protruding rivet head 247. The negative plate 290 is then welded to rivet heat 247 to complete construction of end cap assembly 12. The completed end cap assembly 12 in cell 10 is shown in FIGS. 11 and 12.

In laser welding the edge of metal cover 230 to casing 100 it is preferred to apply a heat conductive medium, desirably a liquid or metal to metal cover 230. The heat conductive medium is preferably a liquid which can be conveniently placed within the well or trough region 235 on the surface of metal cover 230. Such heat conductive medium can absorbs a substantial portion of the heat generated during the laser welding. Sufficient heat can be absorbed in this manner to prevent metal cover 230 from reaching a temperature higher than about 100° C. during the welding when employing a Nd:Yag (or equivalent) laser. Alternatively, the metal cover can be precooled to a temperature less than ambient room temperature (21° C.), preferably to a temperature approaching the freezing point of water and even lower. Such precooling can also help to keep metal cover 230 from exceeding 100° C. during the welding operation. Additionally, the metal cover 230 can be precooled and heat conductive medium also applied to the metal cover 230.

Plastic extender seal 280 is press fitted into casing 100 above metal cover 230. If the metal cover 230 is not kept sufficiently cool during laser welding, seal 280 could possibly overheat to a point adversely affecting its physical properties. This could result in a loss in radial compression, that is, a loosing of the tight fit between seal 280 and casing 100, in turn providing a path to the casing exterior for electrolyte which may have leaked into the region between metal cover 230 and metal cover 280. Thus, it is recommended to keep metal cover 230 sufficiently cool, or apply a heat conductive medium to the metal cover to assure that sufficient heat is absorbed during the laser welding operation. A convenient way of accomplishing this is to simply add a small amount of cool deionized water, e.g at about 5 to 10° C., to the trough region 235 of metal cover 230. This keeps the temperature of metal cover 230 below about 100° C., in turn allowing seal 280 (FIGS. 11 and 12) to stay within a favorable working temperature. (After the laser welding operation sealant, e.g. asphalt sealant, can be added to well area 235 in the manner earlier described.) Alternatively, a metal block (optionally pre-cooled) can be applied in contact with metal cover 230. The metal block, typically of steel, can absorb sufficient heat during welding operation to assure that metal cover 230 does not reach temperatures above about 100° C.

Although water can be added to well area 235 to keep metal cover 230 cool during the laser operation, it will be appreciated that other suitable coolants can be used. For example, instead of pure water, a cool aqueous solution of polyvinylalcohol and potassium hydroxide may be used. The polyvinylalcohol will coat out on the top surface of metal cover 230 thereby providing additional sealing protection between metal cover 230 and seal 280. Such solution can also be applied directly to the underside of plastic seal 280 (FIGS. 11 and 12) thereby providing additional sealing protection to the undersurface of seal 280.

Alternatively, a gelling agent can be added to the aqueous cooling solution supplied to well 235. The term gelling agent is intended to include conventional gelling agents as well as superabsorbents. Such gelling agents include polyacrylic acid, polyacrylates, the sodium salt of an acrylic acid copolymer, carboxymethyl cellulose, sodium carboxymethyl cellulose, starch graft copolymers and the like. The gelling agent will coat the surface of metal cover 230 to provide additional sealing protection between metal cover 230 and seal 280. The gelling agent can be applied as a powder to the underside of plastic seal 280 using compression rollers and the like (FIGS. 11 and 12) to thereby coat seal 280 with gelling agent and provide additional sealing protection.

Figure 17:
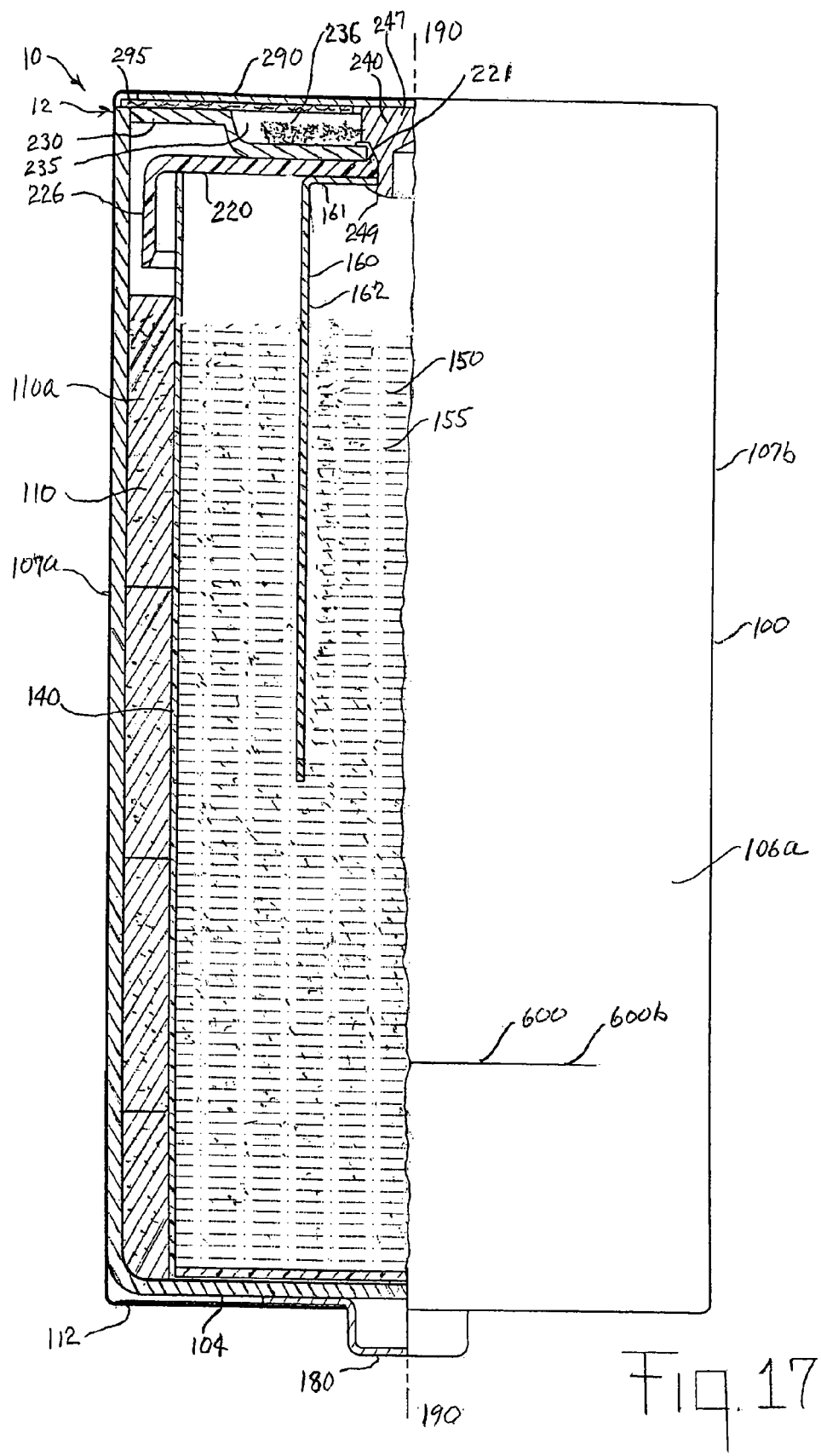
FIG. 17 shows an alternative embodiment similar to the cell of FIG. 11 except that a paper washer is stacked over the welded metal cover instead of a plastic extender.

In the embodiment shown in FIG. 17 employing a paper washer 295 instead of plastic seal 280, the paper washer can be pre saturated with an aqueous solution comprising a gelling agent or with an aqueous solution of polyvinylalcohol and potassium hydroxide. Such prewetting of paper washer 295 provides additional sealing protection should electrolyte leak into the region between metal cover 230 and terminal plate 290 (FIG. 17. Additionally, a separate layer comprising gelling agent powder can be pressed onto the underside of washer 295, using compression rollers and the like or dispersed within the fibrous network comprising washer 295, as described in U.S. Pat. No. 4,999,264.

A separate protruding metal member 180 can be welded to opposing closed end 104 of the cell. In the completed cell 10 (FIGS. 10-13) metal member 180 is in electrical contact with the cell casing and thus forms the cell's positive terminal. End plate 290 is in electrical contact with rivet 240 which in turn in electrical contact with anode current collector 160 and thus forms the cell's negative terminal.

Although the invention is described in detail in terms of the specific embodiments, it will be appreciated that variations in design of specific components are possible and are intended to be within the concept of the invention. For example, the current collector 160 (FIGS. 4 and 13) is shown as an elongated member in the shape of a nail terminating at its top end in a horizontally extending flange 161 with an aperture 164 therethrough. This design is attractive, since it makes it easy to fasten the top flange 161 of current collector 160 to the bottom surface 249 (FIG. 11) of rivet 240. This may be accomplished by conventional riveting technique wherein the bottom surface 249 of the rivet is inserted into the flange aperture 164 and then crimped to secure the current collector flange 161 to rivet 240. In such design the current collector shaft is offset, that is does not lie along the cell's central longitudinal axis. Such offset does not appear to significantly interfere with efficient discharge of the anode or with the overall performance of the cell. The current collector shaft 162 is shown as a straight nail in the embodiment of FIG. 4 and as straight nail having a curved surface in the embodiment shown in FIG. 13. In either case the nail is offset from the cell's central longitudinal axis 190, as shown for example, in FIG. 11.

It will be appreciated that other current collector designs are possible. For example, rivet 240 may be a solid member having a head portion 247 (FIG. 11) with an integrally formed elongated shaft portion (not shown) in the shape of a nail extending downwardly from head 247 and at least partially penetrating into anode 150. In such case the current collector shaft can be oriented so that it is centrally located along the cell's central longitudinal axis 190. The head portion 247 of such rivet can still be welded to the terminal end plate 290 in the manner above described.

Another specific embodiment of the flat cell of the invention is shown in FIG. 17. In this embodiment a paper washer 295, for example of Kraft paper, can be employed between metal cover 290 and the negative terminal plate 290 instead of plastic extender 280. The Kraft paper washer is durable and provides the necessary electrical insulation between metal cover 230 and terminal plate 290. Such design reduces the height of rivet head 247 thereby compacting the total height of the end cap assembly 12. It also has the advantage of eliminating the need to mold a plastic extender 280. This in turn results in more available volume for anode/cathode active material within the cell interior. (The other components of the cell shown in FIG. 17 are essentially the same as those shown and described with respect to the cell shown in FIGS. 10-12.) It will be appreciated that the rivet 240 shown in FIG. 17 with separate current collector 160 fastened thereto may be replaced with a single rivet with integral elongated current collector, e.g. in the shape of a nail, extending therefrom and penetrating at least a portion of anode 150. Such integral current collector may be centrally located along the cell's central longitudinal axis 190.

It will be appreciated that each of the cell embodiments are intended to have a conventional film label wrapped around the cell casing. Suitable plastic films for such a label are known in the art and typically comprise polyvinylchloride. The label can be imprinted with desired design or indicia. Such labels may be adhesive coated, typically at the edges and applied by wrapping around the casing surface. Alternatively, the label can be applied in the form of a sleeve and heat shrunk onto the casing surface. A typical label 12 is shown in FIG. 17.

Separator Fabrication

In the cell embodiment shown in FIGS. 10-13 the separator 140 can be conveniently formed from separator material conventionally employed in alkaline cells. For example, typically of cellulose or cellulosic and polyvinylalcohol fibers. Cell 10 (FIGS. 10-13) may typically be of cuboid configuration having an overall thickness of about 6 mm, a width of about 17 mm and a length of between about 35 and 67 mm. A desirable separator may be composed of a dual layer, the outer layer (facing cathode 110) comprising cellulosic and polyvinylalcohol fibers and the inner layer facing anode 150 comprising a cellulosic material, such as rayon. After the cathode disks 110 are inserted into the casing through open end 102 (FIG. 11) separator 140 is inserted so that the outer layer of separator 140 faces the exposed cathode surface.

Separator 140 for use in the above described flat cell (FIGS. 10-13) is conveniently made by rolling a flat separator sheet as shown in FIGS. 14-14B. The near edge 140a is first folded inwardly in the direction F1 along a bend line 140b which is displaced about 3 to 5 mm from edge 140a. A mandrel (not shown) can be placed against the separator surface 140d. Then separator far edge 140c can be wrapped around the mandrel so that edge 140c passes around edge 140a resulting in the partially wrapped configuration shown in FIG. 14A. Far edge 140c is continually wrapped over the separator surface in the direction F2 (FIG. 14A). Edge 140c can be adhesively secured to the separator surface. The bottom separator edge 142 may then be folded inwardly about 3 mm over the back surface of the separator as shown in FIG. 14B and adhesively secured thereto. The use of adhesive to secure edge 140c and/or bottom separator edge 142 can be eliminated by simply folding bottom separator edge 140c in the direction F3 and then pressing it to form the bag configuration shown in FIG. 14B. When the folded separator is inserted into the casing, the cathode shape also helps maintain the separator in the bag configuration shown in FIG. 14B. The mandrel (not shown) is removed. The resulting wrapped separator 140 (FIG. 14B) is in the shape of a bag having a closed boundary surface 148 with an open end 144 and opposing closed end 143. The separator boundary surface 148 defines a cavity 155 for insertion of anode material 150 therein.

Figure 16:
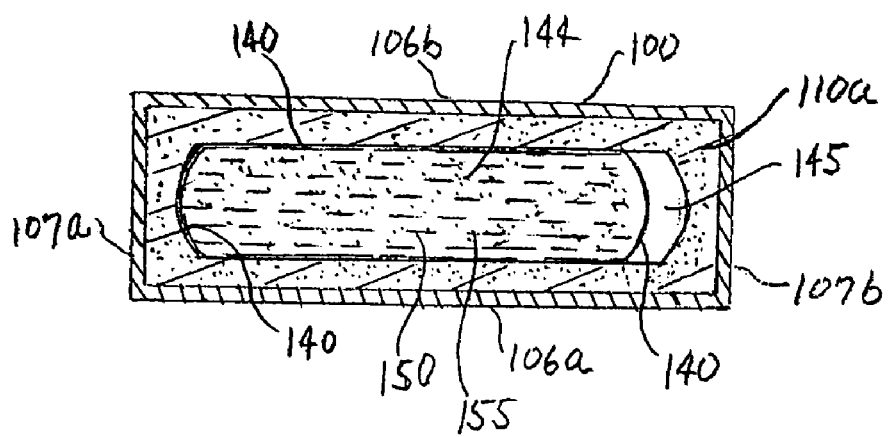
FIG. 16 shows an embodiment wherein there is a gap between a short side of the separator and the cathode.

After the cathode disks 110a are inserted into the cell casing 100, the wrapped separator 140 in the configuration shown in FIG. 14B is inserted so that the separator surface faces the exposed cathode surface. The separator boundary surface 148 forms the anode cavity 155. The anode cavity 155 preferably has an oblong configuration as shown in FIG. 14B. The short dimension of the oblong configuration of cavity 155 may typically be between about 2 and 3 mm for a cell 10 of cuboid configuration and overall thickness of about 6 mm. Preferably, the long dimension of the oblong configuration is somewhat less than the width of the available space within the cell for the total anode cavity 155. This results in a gap 145 between one short side of the separator and cathode disks 110a as shown in FIG. 16. Gap 145 is between about 2 and 4 mm, preferably between about 2 and 3 mm. Anode material 150 can then be filled into the anode cavity 155 through the separator open end 143 resulting in a casing 100 filled with anode material 150, cathode material 110, and separator 140 therebetween, wherein there is a gap 145 (void space) between one short side of the separator and the cathode as shown in FIG. 16.

It has been determined that if desired, additional alkaline electrolyte solution can now be added to the cell interior by dispensing it directly into gap 145. The additional electrolyte may be dispensed into gap 145 by inserting a dispensing nozzle directly into said gap. In a preferred embodiment a small quantity of additional electrolyte solution may be added into gap 145 after the anode 150 and cathode 110 are in place in the cell. In an alterative embodiment a portion of the additional electrolyte may be added to gap 145 after the cathode is in place but before anode material is inserted into the anode cavity. Then anode material can be inserted into the cell's anode cavity and thereafter a final quantity of electrolyte may be added into gap 145. In either case the additional electrolyte helps to improve anode utilization (percent anode actives discharged) and overall cell performance. It can also be a factor tending to retard cell swelling.

The addition of electrolyte solution to the gap 145 between separator 140 and cathode 110 as above described avoids overflow problems which can occur if electrolyte is added directly to the anode. For example, if there is initially no gap between separator 140 and cathode 110 and additional electrolyte is added to the cell interior there may be an overflow of electrolyte into void space 146 (FIG. 11) above anode 150. Such overflow is undesirable, since it could cause wetting along the underside or edge of metal cover 230 after the metal cover 230 is placed in position covering the cell's open end 102. Such wetting in turn would adversely affect proper laser welding of the metal cover 230 to casing 100.

If additional electrolyte is added to gap 145, it is recommended that it be done in incremental steps. For example, if the additional electrolyte is added to gap 145 after the anode 150, cathode 110 and separator 140 is inserted into the casing, it is recommended that such additional electrolyte be added incrementally in a plurality of dispensing steps allowing for a time lapse, typically of between about 1 and 4 minutes between dispenses. This will allow time for each incremental amount of electrolyte to be absorbed into the anode, separator and cathode reducing the chance of any overflow occurring, which could interfere with proper laser welding of metal cover 230. If the cell is a rectangular 7/5-F6 size cell, typically the amount of additional electrolyte solution to be added to gap 145 will be under about 1 gram. Preferably, in such case the electrolyte can be added in about four incremental equal dispenses with a time interval of between about 1 to 4 minutes between dispenses to allow sufficient time for the incremental amounts of electrolyte to be properly absorbed into the anode, cathode and separator. Surprisingly, it has been discovered that when the total of said additional electrolyte is dispensed into gap 145, the anode 150 swells sufficiently to expand the anode cavity 155 bounded by separator surface 148. As anode 150 swells the separator surface 148 is pushed flush against both anode and cathode, thereby completely closing gap 145.

A performance test of cell 10 made in accordance with the embodiment shown and described with reference to FIGS. 10-16 was made and is reported in the following examples. The following specific examples show comparative performance for same size flat alkaline cells discharged fresh. The comparative cell (Comparative Example) used the same size flat cell as shown in FIGS. 10-13 including a conventional zinc anode and a conventional cathode including $MnO_2$ and natural graphite. The test cells (Examples) also used the same size flat cell as shown in FIGS. 10-13, but employed an anode comprising zinc fines and a cathode comprising nickel oxyhydroxide as the cathode active material and an oxidation-resistant graphite. The fresh cell in each case had a thickness of 5.6 mm, a width of 17 mm, and length of 67 mm. (All dimensions are outside dimensions without a label around the casing, unless otherwise specified.) Casing 100 wall thickness was identical at 0.38 mm for all cells tested. The casing 100 for each cell was nickel-plated cold-rolled steel coated on its inner surface with graphitic carbon.

Test Cells

COMPARATIVE EXAMPLE

Zinc/$MnO_2$ Cell with No Zn Fines

Test cells having the same rectangular (i.e., cuboid) configuration as shown in FIGS. 10-13 were prepared. The external dimensions of the cell casings were about 67 mm in length, about 17 mm in width, about 5.6 mm in thickness (i.e., before fresh discharge). The anode and cathode of the test cells of the Comparative Example had the following compositions:

| Anode Composition: | |
|---|---|
| | Wt. % |
| Zinc[1] | 60.0 |
| Surfactant[2] (RM 510) | 0.10 |
| Electrolyte[3] (8.5 N KOH) | 39.90 |
| | 100.00 |

Notes:
[1]Zinc-based particles of −60 mesh size having a mean average particle size of about 150 microns were alloyed and plated with indium to give a total indium content of about 200 ppm relative to the total weight of zinc-based particles.
[2]An organic phosphate ester-based surfactant available in the form of a 3 wt. % solution under the tradename RM 510 from Rhône-Poulenc.
[3]Electrolyte solution containing 35.3 wt. % KOH and about 2 wt. % zinc oxide and also including about 1.5 wt. % (total) of two gelling agents including Waterlock A221 from Grain Processing Corp. and Carbopol C940 from B. F. Goodrich Co..

| Cathode Composition: | |
|---|---|
| | Wt. % |
| $MnO_2$ (EMD)[1] | 83.98 |
| Graphite[2] (NdG-15) | 10.0 |
| Electrolyte (9 N KOH) | 6.02 |
| | 100.0 |

Notes:
[1]Manganese dioxide was an EMD commercially available from Xiangtan Xianghe New Material Co., Ltd. (PRC).
[2]Graphite NdG-15 is a natural graphite having an average particle size of about 8 microns, a BET surface area of about 7.6 $m^2$/g, a crystallite size >200 nm and is available from Nacional de Grafite (Itapecerica, Brazil).

The cathode and anode of the comparative test cells were balanced such that the ratio of the theoretical capacity (in mA-hr) of the $MnO_2$ cathode (based on 370 mA-hr per gram $MnO_2$) divided by the theoretical capacity (in mA-hr) of zinc anode (based on 820 mA-hr per gram zinc) was 1.5. The cathode contained about 6.63 grams of $MnO_2$. The anode contained about 2.0 grams zinc.

Fresh test cells were discharged continuously for 1 hour at a 90 milliwatt drain rate with 100 milliwatt pulses 5 seconds in duration every 10 minutes followed by a 3 hour rest period and then repeating the cycle until a cutoff voltage of 0.9 Volts was reached. (This test can be used to simulate using the cell in a typical solid state audio (SSA) player.) The average service life of the comparative test cells was 20.3 hours. This test was also performed on test cells stored for 2 weeks at up to 55° C. Average service life of stored test cells was 19.3 hours. On average, the cell casing swelled from an initial thickness of 5.6 mm for fresh cells before discharge to 5.95 mm after discharge. Thickness measured between outside surfaces of side walls 106a and 106b as shown in FIG. 1A.

Fresh test cells were discharged for 1 hour at a constant drain rate of 125 milliwatts with 300 milliwatt pulses 5 seconds in duration every 10 minutes, followed by a 3 hour rest period, and then repeating the entire cycle until a cutoff voltage of 0.9 Volt was reached. (This test can be used to simulate using the cell in a CD or MP3 digital audio player.). Average service life of the test cells was 11.2 hours. This test was performed on test cells stored for 2 weeks at up to 55° C. Average service life of stored test cells was 10.6 hours.

Fresh test cells also were discharged continuously for 1 hour at a drain rate of 435 milliwatts with one 1000 milliwatt pulse 20 milliseconds in duration every second, followed by a constant drain rate of 5 milliwatts for 1 hour, then a 1 hour rest period, and repeating the cycle until a cutoff voltage of 1.0 Volts was reached. (This test can be used to simulate using the cell in a high power application, for example, in a personal digital assistant (PDA) having a color display.) Average service life of the test cells was 4.4 hours.

Test Cells

EXAMPLE 1

Zinc/NiOOH Cell with 50 wt. % Zn Fines

Test cells having the same rectangular (cuboid) configuration as shown in FIGS. 10-13 and same size as the test cells of the Comparative Example were prepared. The anode and cathode of the test cells of Example 1 had the following compositions:

| Anode Composition: | |
|---|---|
| | Wt. % |
| Zinc[1] | 60.0 |
| Surfactant[2] (RM 510) | 0.1 |
| Electrolyte[3] (8.5 N KOH) | 39.9 |
| | 100.0 |

Notes:
[1]Zinc-based particles comprising −60 mesh size having a mean average particle size of about 150 microns and zinc fines of −325 mesh size having a mean average particle size of about 35 microns were mixed in a weight ratio of about 1 to 1. That is, the zinc fines comprised about 50 wt. % of the total zinc-based particles in the anode. The zinc-based particles including the zinc fines were alloyed and plated with indium to give a total indium content of about 200 ppm relative to the total weight of zinc-based particles.
[2]An organic phosphate ester-based surfactant available in the form of a 3 wt. % solution under the tradename RM 510 (available from Rhône-Poulenc) was added at the rate of about 50 ppm relative to the total weight of zinc.
[3]Electrolyte solution containing 35.3 wt. % KOH and about 2 wt. % zinc oxide and also including about 1.5 wt. % (total) of two gelling agents including Waterlock A221 (available from Grain Processing Corp.) and Carbopol C940 (available from B. F. Goodrich Co.).

| Cathode Composition: | |
|---|---|
| | Wt. % |
| NiOOH[1] | 85.0 |
| Binder[2] (polyethylene) | 1.0 |
| Graphite[3] (TIMREX SFG15) | 8.0 |
| Electrolyte (7 N KOH) | 6.0 |
| | 100.0 |

Notes:
[1]NiOOH powder is comprised primarily of beta-nickel (+3) oxyhydroxide having an average (i.e., $D_{50}$) particle size of about 19 microns. The NiOOH particles have a surface coating of cobalt oxyhydroxide in the amount of about 4 wt. % of the pure NiOOH. Thus, the actual amount of active NiOOH comprised about 85/1.04 = 81.7 percent by weight of the cathode. The cobalt oxyhydroxide-coated nickel oxyhydroxide powder is available from Kansai Catalyst co., Ltd. (Osaka, Japan).
[2]Binder is a polyethylene available under the trade designation Coathylene from Hoechst Celanese.
[3]Graphite is an oxidation-resistant, synthetic graphite having an average particle size of about 9 microns, a BET urface area of about 9.5 m$^2$/g, and a crystallite size, Lc >100 nm available under the trade designation TIMREX ® SFG15 from Timcal America Co. (Westlake OH).

The cathode and anode of the test cells of Example 1 were balanced such that the ratio of the theoretical capacity (in mA-hr) of the NiOOH (based on 292 mA-hr per gram NiOOH) divided by the theoretical capacity (in mA-hr) of zinc (based on 820 mA-hr per gram zinc) was about 1.0. The anode included about 2.0 grams of zinc-based particles. The cathode included about 6.12 grams of cobalt oxyhydroxide-coated nickel oxyhydroxide wherein the cobalt oxyhydroxide content was about 4 wt. % of the total amount of pure NiOOH. The amount of NiOOH in the cathode (on a pure basis) was 6.12/1.04=5.88 grams.

Fresh test cells were discharged continuously for 1 hour at a 90 milliwatt drain rate with 100 milliWatt pulses 5 second long every 10 minutes, followed by a 3 hour rest period, and then repeating the cycle until a cutoff voltage of 0.9 Volts was reached. Average service life for test cells of Example 1 was 23.9 hours. This test also was performed on test cells stored for 2 weeks at up to 55° C. Average service life of stored test cells was 21.5 hours. On average, the cell casing swelled from an initial thickness of 5.6 mm for fresh cells before discharge to 5.75 mm after discharge. Thickness measured between outside surfaces of side walls 106a and 106b as shown in FIG. 1A.

Fresh test cells were discharged at a constant drain rate of 125 milliwatts with 300 milliWatt pulses of 5 seconds duration every 10 minutes for 1 hour, followed by a 3 hour rest period, and then repeating until a cutoff voltage of 0.9 Volt was reached. Average service life of the test cells of Example 1 was 16.0 hours. This test was also performed on test cells stored for 2 weeks at up to 55° C. Average service life of stored test cells was 14.2 hours.

Fresh test cells also were discharged continuously for 1 hour at a drain rate of 435 milliwatts with one 1000 milliwatt pulse 20 milliseconds in duration every second, then at a constant drain rate of 5 milliwatts for 1 hour, followed by a 1 hour rest period, and repeating the entire cycle until a cutoff voltage of 1.0 Volts was reached. Average service life of test cells of Example 1 was 5.9 hours.

Test Cells

EXAMPLE 2

Zinc/NiOOH Cell with No Zinc Fines

Test cells having the same rectangular (i.e., cuboid) configuration as shown in FIGS. 10-13 and the same size as the test cells of the Comparative Example were prepared. The cathode and anode had the same compositions as the test cells of Example 1. The test cells of Example 2 were identical in every respect to the test cells of Example 1, except that no zinc fines were included in the anode. That is, the zinc-based particles were larger, that is, between −60 mesh and +200 mesh in size.

Fresh test cells were discharged continuously for 1 hour at a 90 milliWatt drain rate with 100 milliWatt pulses of 5 seconds duration every 10 minutes, followed by a 3 hour rest period, and then, repeating the entire cycle until a cutoff voltage of 0.9 Volts was reached. Average service life for the test cells of Example 2 was 23.1 hours. This test also was performed on test cells stored for 2 weeks at up to 55° C. Average service life of stored test cells was 22.0 hours. On average, the cell casing swelled from an initial thickness of 5.6 mm for fresh cells before discharge to 5.78 mm after discharge. Thickness measured between outside surfaces of side walls 106a and 106b as shown in FIG. 1A.

Fresh test cells also were discharged at a constant drain rate of 125 milliWatts with 300 milliWatt pulses of 5 seconds duration every 10 minutes for 1 hour, followed by a 3 hour rest period and then repeating the cycle until a cutoff voltage of 0.9 Volt was reached. Average service life of test cells of Example 2 was 15.2 hours. This test was also performed on test cells stored for 2 weeks at up to 55° C. Average service life of stored test cells was 12.7 hours.

Discussion of the Performance Test Results

The performance test results for the flat zinc/NiOOH cells of the invention clearly demonstrate an improvement in service life at both low and high drain rates for test cells with cathodes comprising nickel oxyhydroxide compared to the same size test cells with cathodes comprising manganese dioxide. The improvement is more pronounced at higher drain rates. At relatively low intermittent drain rates, for example, between 90 and 100 milliWatts, average service life of fresh zinc/NiOOH test cells of Example 1 was 23.9 hours versus 20.3 hours for the same size fresh zinc/$MnO_2$ test cells of the Comparative Example. This represents an improvement of about 18%. At somewhat higher intermittent drain rates, for example, between 125 and 300 milliwatts, average service life of fresh zinc/NiOOH test cells of Example 1 was 16.0 hours versus 11.2 hours for the same size fresh zinc/$MnO_2$ test cells of the Comparative Example. This represents an improvement of about 43%. At even higher intermittent drain rates, for example, between 435 and 1000 milliwatts, average service life of fresh zinc/NiOOH test cells of Example 1 was 5.9 hours versus 4.4 hours for the same size fresh zinc/$MnO_2$ test cells of the Comparative Example. This represents an improvement of about 34%.

The test results also show an additional improvement in service life, particularly at higher drain rates, for test cells of Example 1 having zinc fines in the anode versus the same size test cells of Example 2 not having zinc fines in the anode. At relatively low intermittent drain rates, for example, between 90 and 100 milliwatts, the average service life for test cells of Example 1 with 50 wt. % zinc fines was 23.9 hours versus 23.1 hours for test cells of Example 2 with no zinc fines. This represents an improvement of about 3%. At somewhat higher intermittent drain rates, for example, between 125 and 300 milliwatts, average service life for test cells of Example 1 with 50 wt. % zinc fines was 16.0 hours versus 15.2 hours for the test cells of Example 2 with no zinc fines. This represents an improvement of about 5%.

The test results further show that average service lives for test cells of Example 1 and Example 2 stored for 2 weeks at up to 55° C. before testing are both greater than that for test cells of the Comparative Example when discharged at low to moderate drain rates. When stored test cells were discharged at relatively low intermittent drain rates, for example, between 90 and 100 milliwatts, the average service life of test cells of both Example 1 and Example 2 was about 22 hours, whereas that for test cells of the Comparative Example was 19.3 hours. When stored test cells were discharged at moderate intermittent drain rates, for example, between 125 and 300 milliwatts, the average service life of test cells of Example 1 was 14.2 hours and that for test cells of Example 2 was 12.7 hours, whereas that for test cells of the Comparative Example was only 10.6 hours.

The test results also show that the amount of deformation of the cell casing by swelling or bulging after discharge of the flat Zn/NiOOH cells of the invention is much less than that for the same size flat zinc/$MnO_2$ cells. For example, the test cells of both Example 1 and Example 2 expanded by 3% whereas the test cells of the Comparative Example expanded by about 6% after intermittent discharge at low drain rates (e.g., 90 and 100 mW).

Although the preferred embodiments of the invention have been described with respect to a flat alkaline cell having an overall cuboid shape (i.e., rectangular parallelepiped), it will be appreciated that variations of such overall shape are possible and are intended to fall within the concept of the invention. In the case of a flat battery, for example, having a cuboid shape, the terminal ends of the casing can be slightly tapered either outwardly or inwardly, and yet maintain the rectangular configuration. The overall appearance of such a varied shape is still essentially that of a cuboid and is intended to fall within the meaning of cuboid or the legal equivalent thereof. Other variations to the overall shape such as slightly altering the angle that the ends of the cell can make with any one of the sides of the casing, so that the parallelepiped slightly deviates from strictly rectangular is also intended to fall within the meaning of cuboid as used herein and in the claims.

The present invention desirably is intended to extend to an overall battery shape that is flat, that is, a side of the outer casing along the length of the casing is substantially flat. Thus, it shall be understood that the term "flat" is intended also to extend to and include surfaces that are substantially flat in that their degree of curvature may be slight. In particular, the concept of the present invention is intended to extend to flat batteries wherein a side of the casing surface along the length of the casing can have a flat polygonal surface. The battery can thus have the overall shape of a polyhedron with all sides of the outer casing being polygonal. The invention is also intended to extend to batteries wherein a side of the battery casing along its length has a flat surface and is a parallelogram, wherein the overall shape of the battery is essentially prismatic.

What is claimed is:

1. A primary alkaline cell comprising a negative and a positive terminal, and an outer casing having a pair of opposing sides running along a portion of the length of said casing, said casing having a closed end and an opposing open end, said cell further comprising an anode comprising zinc and a cathode comprising nickel oxyhydroxide within said casing, a separator between said anode and cathode, and an end cap assembly sealing the open end of said casing thereby forming a boundary surface around the cell interior;

wherein said cathode comprises at least one cathode slab having an opening defined therethrough devoid of cathode material, with at least a portion of the outer surface of said cathode contacting the inside surface of said outer casing; wherein the cathode comprises a plurality of rectangular shaped cathode slabs; wherein each of said slabs has a central opening devoid of cathode material; wherein said cathode slabs are stacked within the casing so that said openings devoid of cathode material form a core, with the outer surface of said cathode contacting the inside surface of said casing wherein the total zinc in the anode comprises zinc fines of dimensions suitable to pass through a standard 200 mesh screen having square openings of 0.075 mm and said total zinc in the anode further comprises zinc particles of larger size than said zinc fines so that the mean average particle size of said total zinc is between about 75 and 340 microns.

2. The alkaline cell of claim 1 wherein the inside surface of said casing contacting the outer surface of said cathode slabs has a conductive coating thereon comprising an oxidation-resistant graphite.

3. The alkaline cell of claim 1 wherein said opposing sides are at least substantially flat.

4. The alkaline cell of claim 1 wherein said outer casing is of cuboid shape.

5. The alkaline cell of claim 1 wherein said nickel oxyhydroxide is in the form of a powder having a mean average particle size between about 2 and 50 microns.

6. The alkaline cell of claim 1 wherein said nickel oxyhydroxide further comprises a bulk chemical dopant selected from the group consisting of aluminum, magnesium, cobalt, zinc, gallium, indium, and any mixture thereof.

7. The alkaline cell of claim 1 wherein said nickel oxyhydroxide comprises a nickel oxyhydroxide selected from the group consisting of beta-nickel oxyhydroxide and gamma-nickel oxyhydroxide and mixtures thereof.

8. The alkaline cell of claim 1 wherein said nickel oxyhydroxide is in the form of a powder comprising particles and at least a portion of the surfaces of said nickel oxyhydroxide particles is coated with cobalt oxyhydroxide.

9. The alkaline cell of claim 1 wherein said cathode comprises between about 80 and 95 percent by weight nickel oxyhydroxide.

10. The alkaline cell of claim 1 wherein said cathode further comprises electrolytic manganese dioxide in an admixture with said nickel oxyhydroxide.

11. The alkaline cell of claim 1 wherein said cathode further comprises a conductive carbon comprising oxidation resistant graphite.

12. The alkaline cell of claim 11 wherein said oxidation resistant graphite has a total ash content of less than 0.1 percent by weight.

13. The alkaline cell of claim 12 wherein said oxidation resistant graphite is in a particulate form having a B.E.T. specific surface area of less than 10 $m^2/g$.

14. The alkaline cell of claim 13 wherein said oxidation resistant graphite has an average particle size ranging between about 3 and 30 microns as determined by laser diffraction.

15. The alkaline cell of claim 14 wherein said oxidation resistant graphite has an average particle size ranging between about 5 and 20 microns as determined by laser diffraction.

16. The alkaline cell of claim 11 wherein said oxidation resistant graphite has a total ash content of less than 0.1 percent by weight, a B.E.T. specific surface area of less than 10 $m^2/g$, and a mean average particle size ranging between about 5 and 20 microns as determined by laser diffraction.

17. The alkaline cell of claim 14 wherein the oxidation resistant graphite has a high degree of crystallinity, characterized by having a value for crystallite size, along the crystallographic "c"-axis direction, Lc, of greater than 1500 Angstrom and a $d_{002}$ lattice constant of less than 3.356 Angstrom.

18. The alkaline cell of claim 14 wherein the oxidation resistant graphite has a value for crystal lattice defect ratio of less than about 0.15, wherein said defect ratio is defined as the ratio of the integrated area underlying the "D" band centered between 1330 and 1360 $cm^{-1}$ to the integrated area underlying the "G" band centered between 1570 and 1580 $cm^{-1}$ in the first order laser Raman absorption spectrum.

19. The alkaline cell of claim 11 wherein the oxidation resistant graphite is in the form of particles having a mean average particle size between about 3 and 30 microns.

20. The alkaline cell of claim 11 wherein the oxidation resistant graphite is in the form of particles having a mean average particle size between about 5 and 20 microns.

21. The alkaline cell of claim 1 wherein the inside surface of said outer casing faces said cathode and said inside surface has a coating thereon comprising an oxidation-resistant graphite.

22. The alkaline cell of claim 1 wherein said anode and cathode further comprises an electrolyte comprising an aqueous solution of potassium hydroxide.

* * * * *